United States Patent [19]

Utsumi et al.

[11] Patent Number: 5,331,498
[45] Date of Patent: Jul. 19, 1994

[54] TAPE CASSETTE INCLUDING A LOCKING SLIDER

[75] Inventors: Mitsuo Utsumi, Yawata; Osamu Zaitsu, Neyagawa; Makoto Okuda, Hirakata; Jiro Kajino; Tatsuhiro Yabuki, both of Neyagawa, all of Japan

[73] Assignee: Matsushita Electric Industrial Co., Ltd., Kadoma, Japan

[21] Appl. No.: 842,923

[22] Filed: Feb. 27, 1992

[30] Foreign Application Priority Data

| Mar. 4, 1991 | [JP] | Japan | 3-037246 |
| May 13, 1991 | [JP] | Japan | 3-107185 |
| Jun. 20, 1991 | [JP] | Japan | 3-148502 |
| Jul. 12, 1991 | [JP] | Japan | 3-172531 |

[51] Int. Cl.⁵ ............................................ G11B 23/087
[52] U.S. Cl. .................................. 242/347.1; 360/132
[58] Field of Search ............... 360/132; 242/198, 197, 242/199

[56] References Cited

U.S. PATENT DOCUMENTS

| 4,004,752 | 1/1977 | Kamaya | 242/198 |
| 4,576,345 | 3/1986 | Koken et al. | 242/198 |
| 4,683,510 | 7/1987 | Meguro | 360/132 |
| 4,698,713 | 10/1987 | Kawada | 360/132 |
| 4,775,911 | 10/1988 | Sato et al. | 360/132 |
| 4,916,565 | 4/1990 | Breuer et al. | 360/132 |

FOREIGN PATENT DOCUMENTS

| 0078696 | 5/1983 | European Pat. Off. |
| 0411673 | 2/1991 | European Pat. Off. |
| 57-147174 | 10/1982 | Japan |
| 60-133580 | 7/1985 | Japan |
| 63-276773 | 11/1988 | Japan |
| 2177843 | 1/1987 | United Kingdom |

Primary Examiner—Stuart S. Levy
Assistant Examiner—Paul J. Ditmyer
Attorney, Agent, or Firm—Ratner & Prestia

[57] ABSTRACT

A tape cassette to be mounted on a magnetic recording-/reproducing apparatus. A magnetic tape is extended in front of an opening formed at a front part of a housing. The housing is provided with a front cover for covering the tape. The tape is exposed by an upward rotation of the front cover. The front cover is upwardly rotated when a slider, which is slidably attached to the housing, is slid rearward with respect to the housing. The slider, which is in engagement with an engaging member, is slid by relative movement of the engaging member and the housing. The slider is locked to the housing by a locking member, which unlocks the slider when the engaging member is engaged with the slider.

5 Claims, 20 Drawing Sheets

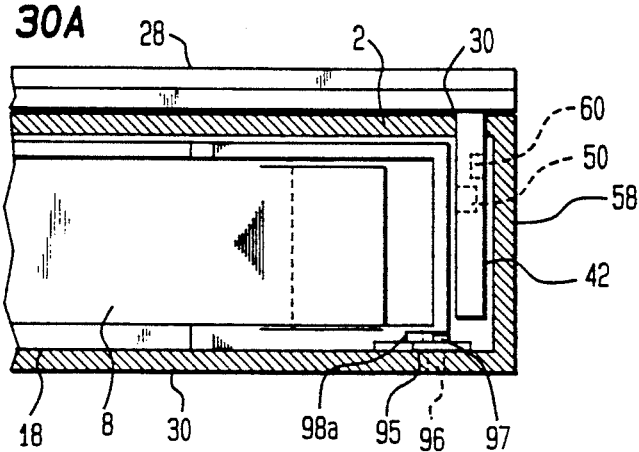
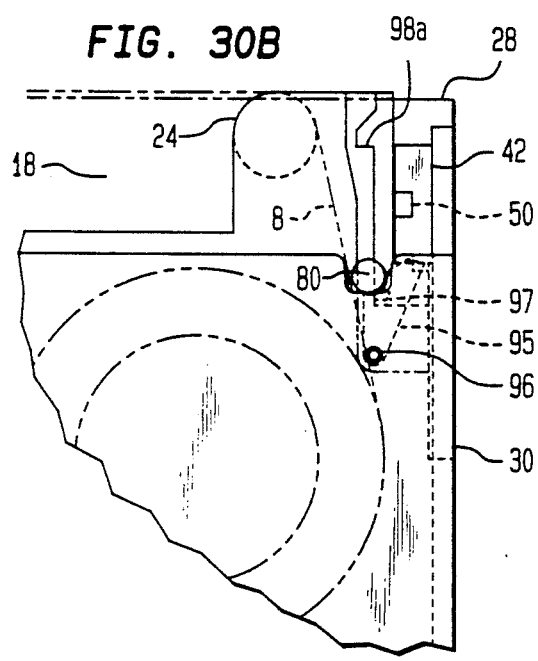
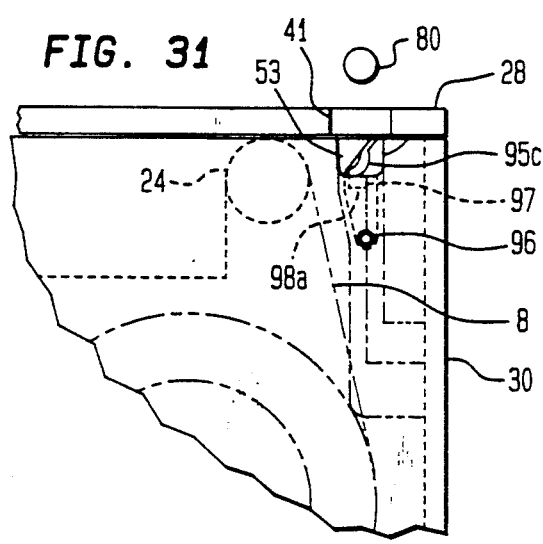

TAPE CASSETTE INCLUDING A LOCKING SLIDER

BACKGROUND OF THE INVENTION

1. Field of the Invention

The present invention relates to a tape cassette used for magnetic recording/reproducing apparatus such as a video cassette recorders. Hereinafter, a tape cassette will be referred to as the "cassette", a magnetic tape as the "tape", and a magnetic recording/reproducing apparatus as the "apparatus".

2. Description of the Prior Art

As an example of a known cassette, an 8 mm cassette disclosed in Japanese Laid-Open Patent Publication No. 1-320693 will be illustrated:

Referring to FIGS. 35 to 38, the illustrated 8 mm cassette, used for a video tape recorder, includes a housing 101 in which a first reel 102 and a second reel 103 are disposed. A tape 104 is carried on the first reel 102 and the second reel 103 so as to run from the former to the latter through an opening 107 formed at a front of the housing 101. A plurality of loading posts in the apparatus are maneuvered in the opening 107 so as to bring the tape into engagement with a rotary head cylinder.

The housing 101 is provided with a rotary front cover 105 which completely covers the tape 104 and front side surfaces of the housing 101. When the front cover 105 is upwardly rotated (in a clockwise direction in FIG. 36) around a pair of fixed pins 108, a rear cover 106 is urged so as to take an upward position.

As shown in FIG. 37, a lock 110 for prohibiting the rotation of the front cover 105 is supported rotatably forwardly and rearwardly in a rear portion of the opening 107. When the lock 110 is moved forwardly, the lock 110 comes into engagement with a protection 111 provided on a Side surface of the front cover 105, thereby prohibiting the front cover 105 from upwardly rotating. When the cassette is placed in a cassette holder of the apparatus, the lock 110 is rearwardly rotated with respect to the housing 101 by a tip portion 113 of an unlocking pin 112 and thus is disengaged from the projection 111, thereby enabling the front cover 105 to upwardly rotate. A front cover releasing pin 114 provided in the cassette holder is upwardly moved with respect to the cassette, thereby rotating the front cover 105 upwardly. In this way, the tape 104 extended in front of the housing 101 is exposed, and the loading posts are maneuvered into the opening 107 so as to stretch the tape 104 forwardly.

Under the construction described above, when the front cover 105 and the rear cover 106 are opened, they are overlapped on the housing 101 as indicated by the two-dot chain line of FIG. 36. To accommodate the overlapping covers 105 and 106, the cassette holder of the apparatus must have a sufficient space.

Further, the cassette holder must have the unlocking pin 112 for unlocking the front cover 105 and the front cover releasing pin 114 for allowing the front cover 105 to upwardly rotate. Accordingly, it is unavoidable that the construction of the cassette holder is complicated and economically poor.

SUMMARY OF THE INVENTION

An object of the present invention is to provide a tape cassette in which a front cover can be unlocked and rotated by an identical member.

Another object of the present invention is to provide a tape cassette which is compact with a front clover being at an upward position and is excellent in appearance.

The tape cassette of this invention, which overcomes the above-discussed and numerous other disadvantages and deficiencies of the prior art, comprises a housing including a pair of reels carrying a tape so as to expose the tape in front of the housing; a slider attached to the housing so as to be slidable in a direction perpendicular to a tape extending direction, the slider having a recess into which an engaging member for sliding the slider is allowed to insert; a front cover supported by the slider and by the housing so as to cover the tape; a moving mechanism for sliding the front cover away from the tape while rotating the front cover so as to expose the tape, in accordance with a movement of the slider away from the tape; and a locking member attached to the housing in a state of being loaded to lock the slider so as to prohibit the slider from sliding, the locking member unlocking the slider by an insertion of the engaging member into the recess of the slider.

In a preferred embodiment, the housing includes a pair of projecting parts disposed in opposite side portions along the tape extending direction and an opening defined by the projecting parts so as to allow loading posts to be inserted therein in the opposite direction to a direction of the rotation of the front cover for exposing the tape; the slider includes a pair of surfaces, each covering a side of the opening into which the loading posts are inserted and a side surface of the corresponding projecting part; and the locking member is provided in a pair, each locking member being located between the corresponding surface of the slider and the corresponding projecting part.

In a preferred embodiment, the recess is formed in a pair, each recess being opposed to the corresponding projecting part.

In a preferred embodiment, the front cover has a pair of cutouts arranged in correspondence with the recesses, each cutout allowing the engaging member to be inserted therein.

In a preferred embodiment, each locking member has a locking part, which is engaged with the corresponding surface of the slider.

In a preferred embodiment, the locking member includes a guide groove along which the engaging member in engagement therewith is guided so as to slide the slider away from the tape in the state where the locking member is disengaged from the slider.

In a preferred embodiment, the locking member includes a guiding surface extended in a sliding direction of the slider so as to guide the engaging member in contact therewith to move the slider away from the tape in the state where the locking member is disengaged from the slider.

Alternatively, the tape cassette comprises a housing including a pair of reels carrying a tape so as to expose the tape in front of the housing; a slider attached to the housing so as to be slidable in a direction perpendicular to a tape extending direction, the slider having a recess into which an engaging member for sliding the slider is allowed to insert; a front cover supported by the slider and by the housing so as to cover the tape; a moving mechanism for sliding the front cover away from the tape while rotating the front cover so as to expose the tape, in accordance with a movement of the slider away from the tape; and a locking member attached to the slider in a state of being loaded to lock the housing so as to prohibit the slider from sliding, the locking member unlocking the housing by an insertion of the engaging member into the recess of the slider.

In a preferred embodiment, the housing includes a pair of projecting parts disposed in opposite side portions along the tape extending direction and an opening defined by the projecting parts so as to allow loading posts to be inserted therein in the opposite direction to a direction of the rotation of the front cover for exposing the tape; the slider includes a pair of surfaces, each covering a side of the opening into which the loading posts are inserted and a side surface of the corresponding projecting part; and the locking member is provided in a pair, each locking member being located between the corresponding surface of the slider and the corresponding projecting part.

In a preferred embodiment, the recess is formed in a pair, each recess being opposed to the corresponding projecting part.

In a preferred embodiment, the front cover has a pair of cutouts arranged in correspondence with the recesses, each cutout allowing the engaging member to be inserted therein.

In a preferred embodiment, each locking member includes a locking part projected toward the corresponding projecting part; each projecting part has a first guide groove with which the locking part is engaged so as to be slid in a sliding direction of the slider; and the first guide groove has a recess by which the locking part is to be stopped so as to prohibit the slider from sliding with respect to the housing.

In a preferred embodiment, each locking member has an engaging portion with which the engaging member to be engaged with the corresponding recess of the slider is to be engaged.

In a preferred embodiment, each projecting member has a second guide groove, along which the engaging member in engagement with the corresponding engaging portion of the locking member is guided in the sliding direction of the slider.

In a preferred embodiment, the engaging portion of each locking member includes a periphery, which has a bank to be engaged with the corresponding recess of the slider.

In a preferred embodiment, each locking member has a wing projected toward the surface of the slider; and an end of the wing is slidably engaged with a groove formed in the corresponding surface of the slider.

According to the above configurations, the front cover is rotated by a sliding movement of the slider with respect to the housing. In the state where the slider is not slid with respect to the housing, the slider is locked to the housing by the locking member. When the engaging member for sliding the slider comes into engagement with the slider, the slider is disengaged from the housing. Then, the engaging member slides the slider with respect to the housing, whereby the front cover is upwardly rotated so as to expose the tape. Since the cassette holder to receive the cassette is required to have only the engaging member therein according to the above configurations, the construction of the cassette can be simplified.

The locking member may be attached either to the housing or the slider. In the case that the locking member is attached to the housing, a guiding member for guiding the engaging member is attached to the locking member. In the case that the locking member is attached to the slider, the locking member is pressurized by the engaging member so as to slide the slider. In the latter case, since the locking member is slid together with the slider, a construction in which the locking member is covered with the slider results in an excellent appearance.

BRIEF DESCRIPTION OF THE DRAWINGS

This invention may be better understood and its numerous objects and advantages will become apparent to those skilled in the art by reference to the accompanying drawings as follows:

FIG. 30A is a front sectional view of the main part illustrating a still further example of operation of the lock of the tape cassette of FIG. 23;

FIG. 30B is a bottom view thereof;

FIG. 31 is a bottom view of a main part of a fourth example of the tape cassette according to the invention;

DESCRIPTION OF THE PREFERRED EMBODIMENTS

Example 1

Referring to FIGS. 1 to 14, the cassette has a cassette housing composed of halved portions: that is, an upper portion 4 and a lower portion 6. The cassette housing will hereinafter be referred to as the "housing".

Figure 1:
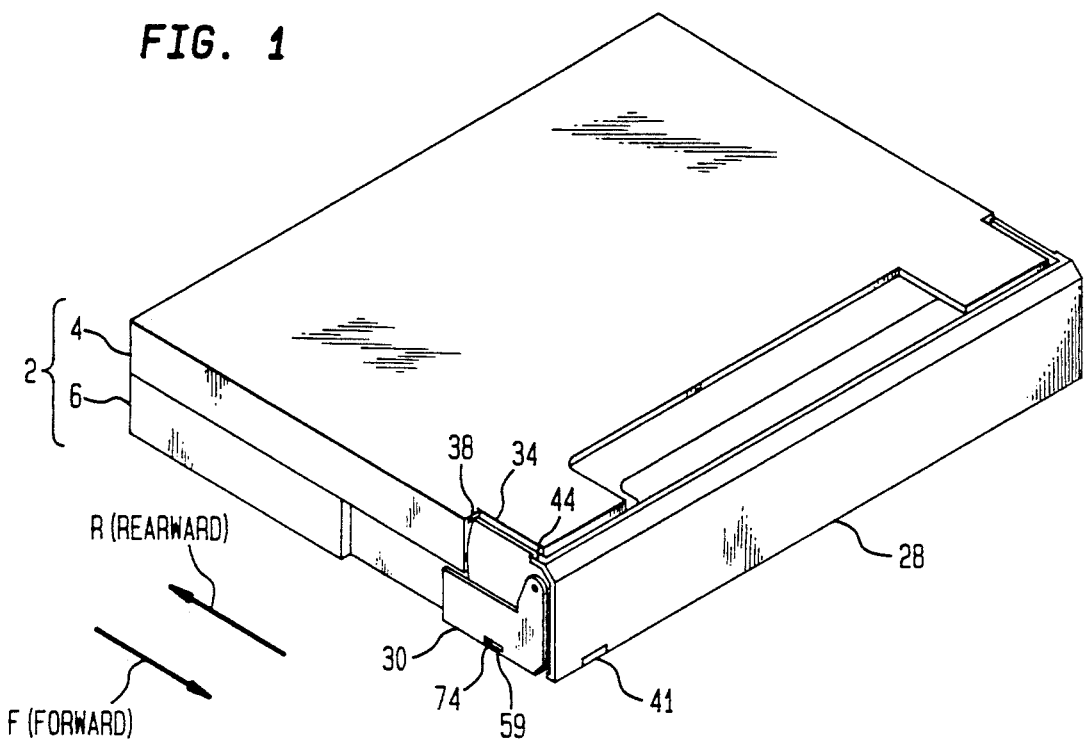
FIG. 1 is a perspective view of a tape cassette according to the invention.
Figure 2:
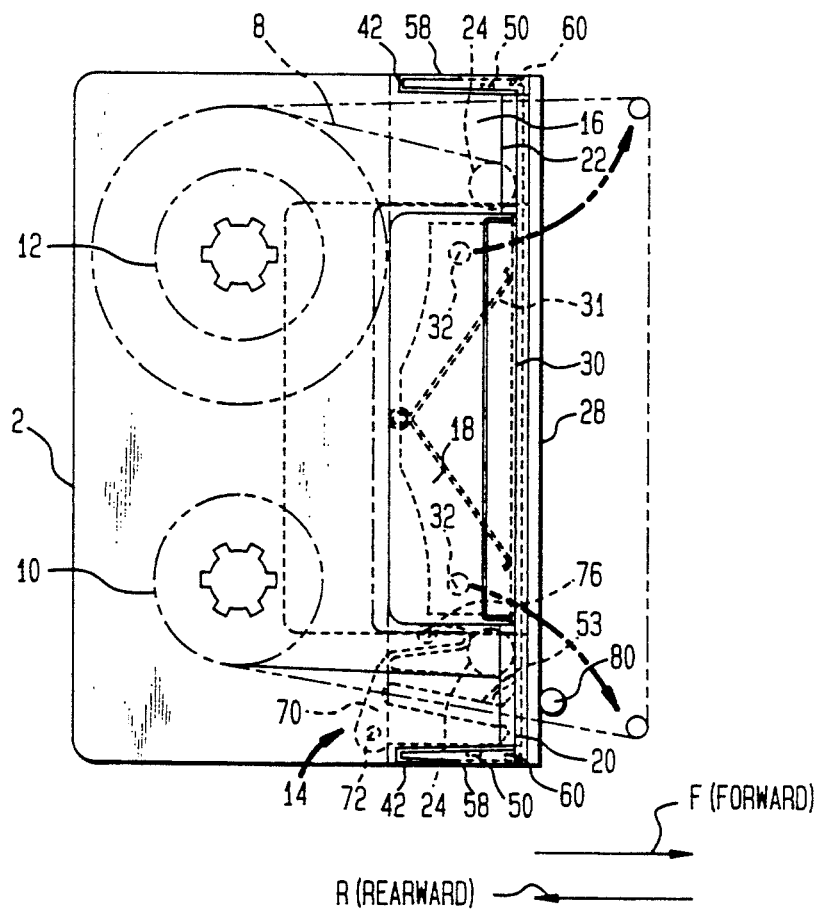
FIG. 2 is a plan view of the tape cassette of FIG. 1.

As shown in FIG. 2, the housing 2 includes a first reel 10 and a second reel 12, and the tape 8 is carried on these reels. The cassette is moved in the direction of arrow F (will hereinafter be referred to as "forward") to be mounted on the apparatus and is moved in the direction of arrow R (will hereinafter be referred to as "rearward") to be dismounted from the apparatus.

The housing 2 includes a pair of projecting parts 14 projecting forwardly in the front side portions thereof. An opening 18 is defined at opposite sides thereof by the projecting parts 14. The tape 8 is carried on the first reel 10 and the second reel 12, between which the tape 8 is extended through tape running apertures 20 of the projecting parts 14. Each projecting part 14 is provided with a guide 24 at a point adjacent to the tape running aperture 20. The tape 8 passes over the guides 24 in a stretched state and covers a front portion of the opening 18 of the housing 2.

Figure 3:
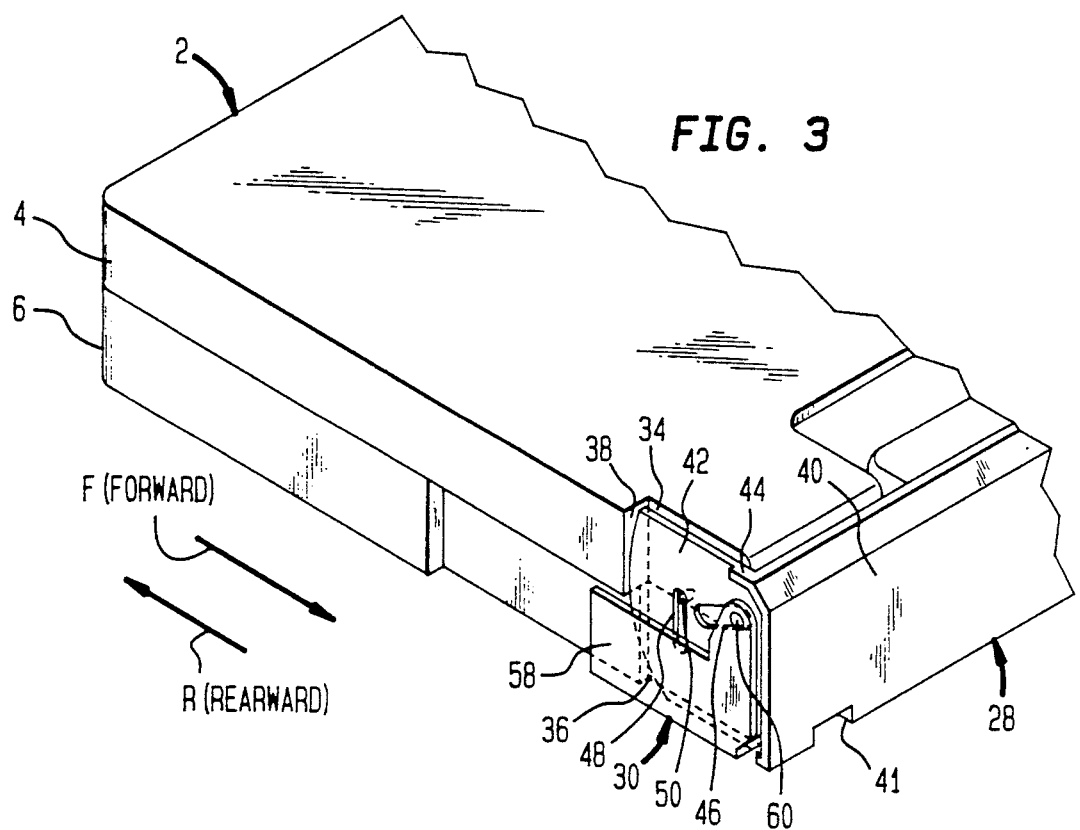
FIG. 3 is a perspective view of a main part of the tape cassette of FIG. 1.

In FIG. 3, the reference numeral 28 denotes a front cover rotatably disposed covering the extended tape 8. The reference numeral 30 denotes a slider capable of sliding forwardly and rearwardly and disposed in front of the housing 2.

When the cassette is placed in the cassette holder of the apparatus, the slider 30 is slid rearwardly with respect to the housing 2, thereby rotating the front cover 28 upwardly. In this state, as shown in FIG. 2, a pair of loading posts 32 disposed in the apparatus are inserted into the opening 18 from below, thereby stretching the tape 8 forwardly as indicated by the two-dot chain line.

As shown in FIG. 3, the upper portion 4 includes a recess 34 located at a forward section, and the lower portion 6 includes a recess 36 located at a forward section. The recesses 34 and 36 each include a step in the depth thereof. The recesses 34 and 36 are located on both sides of the housing 2 although only one side is shown in FIG. 3.

The front cover 28 includes a front face 40 located in front of the tape 8 and leg portions 42 on opposite sides. The leg portions 42 are located in the recesses 34 and 36.

Figure 4:
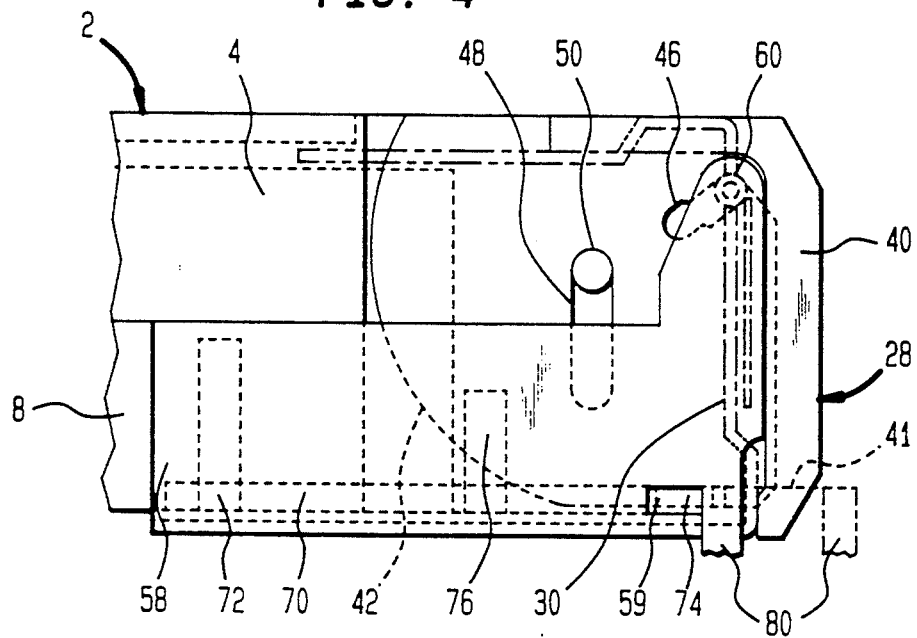
FIG. 4 is a side view of the main part of the tape cassette of FIG. 1.

The leg portion 42 of a substantially rectangular shape includes an abutment 44 extending outwardly at an upper part, an arched portion at a lower part of a rear end as shown in FIG. 4, a first guide slot 46, and a second guide slot 48. The second guide slot 48 allows a guide post 50 erected on a side of the projecting part 14 to slide therein.

Figure 5:
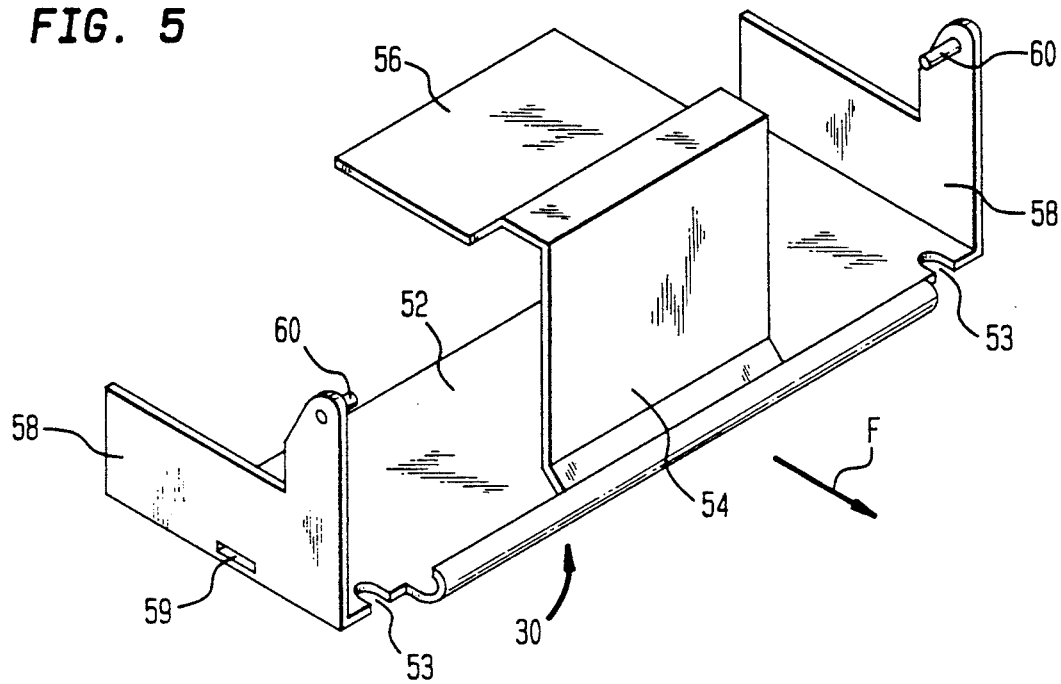
FIG. 5 is a perspective view of a slider used in the tape cassette of FIG. 1.

As shown in FIG. 5, the slider 30 is made by shaping a plate so as to have a bottom portion 52 covering a lower portion of the opening 18 and a bottom surface of the projecting portions 14, a front portion 54 extended perpendicularly from the bottom portion 52 so as to be located rear to the extended tape 8, a top portion 56 extended rearwardly from the front portion 54 so as to cover an upper portion of the opening 18, and side portions 58 each extended perpendicularly from the bottom portion 52. The front portion 54 has a reinforcing protruded portion adjacent to the bottom portion 52. The slider 30 is slidable along the outer side surfaces of the housing 2 (This will be referred to as the "longitudinal direction", hereinafter) and is normally loaded forwardly by a spring 31 (FIG. 2).

The top portion 56 of the slider 30 extends beyond a rear end of the opening 18 of the housing 2. Each side portion 58 is as high as the lower portion 6 of the housing 2 except for a forward portion which is slightly lower than the height of the upper portion 4 of the housing 2. The lower portion 6 has a cutaway portion which allows a rear part of the side portion 58 of the slider 30 to fit in (FIG. 3). Each side 58 of the slider 30 is provided with a shaft 60 extending inwardly, which is slidably supported in the first guide slot 46.

Figure 6:
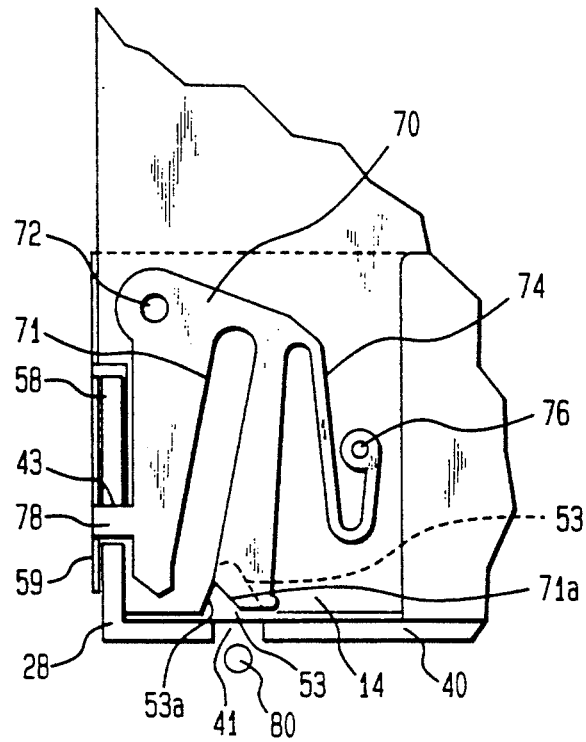
FIG. 6 is a bottom view of a lock disposed in the tape cassette of FIG. 1.

As shown in FIG. 6, the projecting part 14 is provided with a lock 70 on the bottom surface thereof. The lock 70 is substantially rectangular, and a curved outward rear corner portion thereof is rotatably supported by a supporting pin 72 which is vertically erected on the bottom surface of the projecting part 14. A curved inward rear portion has a lengthy elastic piece 74 extended forwardly. A tip of the elastic piece 74 is fixed by a fixing pin 76 vertically erected on the bottom surface of the projecting part 14. The lock 70 is normally loaded by the elastic piece 74 outwardly around the supporting pin 72.

The lock 70 includes an outwardly projecting locking part 78 in a forward portion thereof, which is inserted by the elastic piece 74 into a cutout 43 of the leg portion 42 and then into an engaging slot 59 of the side portion 58 of the slider 30. In the state where the front cover 28 is at a downward position and the slider 30 is at a forward position, the cutout 43 is aligned with the engaging slot 59.

The lock 70 has a guide groove 71, which is diagonally inclined so as to locate a rear portion thereof more inwardly than a forward portion thereof. The guide groove 71 is open forwardly, and a forward portion of an inner periphery of the guide groove 71 is an inlet portion 71a, which is diagonally inclined so as to locate a forward portion thereof more inwardly than a rear portion thereof. The bottom portion 52 of the slider 30 has a pair of recesses 53, on opposite sides, which are open forwardly, and the inlet portion 71a is located in the recess 53. Both peripheries of each recess 53 are diagonally inclined so as to narrow the recess 53 at the rear end thereof, and the outer periphery 53a crosses the inlet portion 71a.

The front face 40 of the front cover 28 has a pair of cutouts 41 on opposite sides, each of which is opposed to the inlet portion 71a. When the cassette is placed in the cassette holder, each of a pair of engaging pins 80 provided in the cassette holder passes through the cutout 41. The engaging pin 80 then goes into the recess 53 so as to be located between the periphery 53a and the inlet portion 71a. The slider 30 is moved rearwardly by the engaging pin 80 which comes into engagement with the recess 53.

Figure 7:
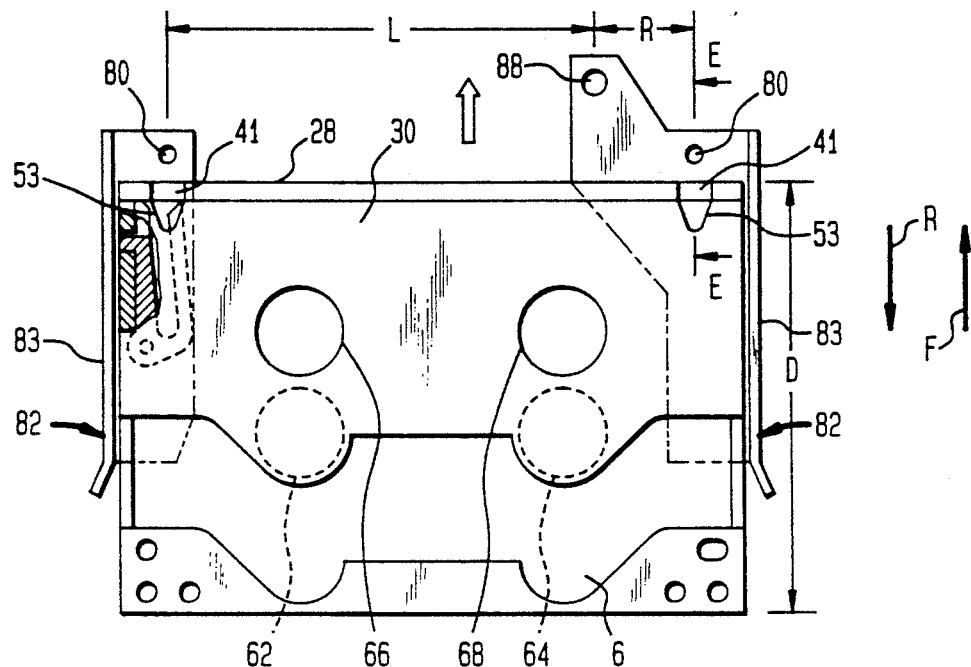
FIG. 7 is a bottom view of the tape cassette of FIG. 1 placed in a cassette holder of a magnetic recording/reproducing apparatus.
Figure 8:
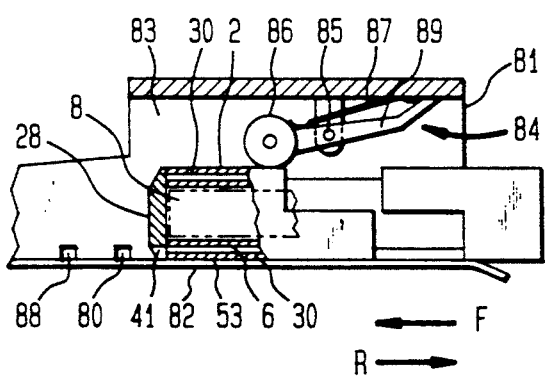
FIG. 8 is a cross-sectional view of the cassette holder in which the tape cassette is placed.

The apparatus includes the cassette holder as shown in FIGS. 7 and 8. The cassette holder holds the cassette which is inserted forwardly from an insertion opening 81. The cassette holder includes a pair of cassette bearers 82 for supporting a bottom of the cassette and a pusher 84 (FIG. 8) for pressing the cassette downwardly. The cassette bearers 82 are extended in the longitudinal direction and are arranged in a tape extending direction (perpendicular to the longitudinal direction; will be referred to as the "transverse direction", hereinafter) with an appropriate space therebetween. The cassette bearer 82 has a guide surface 83 along which a side surface of the cassette is slid.

The pusher 84, disposed above the cassette bearer 82, includes a supporting shaft 85 horizontally supported by the apparatus, a supporting arm 89 rotatably supported by the supporting shaft 85 and extended in a longitudinal direction, and a pressure roller 86 rotatably supported at a tip of the supporting arm 89. The supporting arm 89 is loaded downwardly by a leaf spring 87 so as to press the roller 86 downwardly. The pressure roller 86 is frictionally rotatable on an upper surface of the cassette in contact therewith.

As shown in FIG. 7, the engaging pins 80 are erected deep inside the cassette bearer 82, and are arranged in the transverse direction so as to simultaneously go through the cutouts 41 of the front cover 28.

The lower portion 6 of the housing 2 includes throughholes 62 and 64 in correspondence with the shaft centers of the first reel 10 and the second reel 12. The bottom portion 52 of the slider 30 has semicircular portions projected rearwardly so as to cover the throughholes 62 and 64. The bottom portion 52 also has throughholes 66 and 68, which are aligned with the throughholes 62 and 64 when the slider 30 is at a rearward position.

Figure 9:
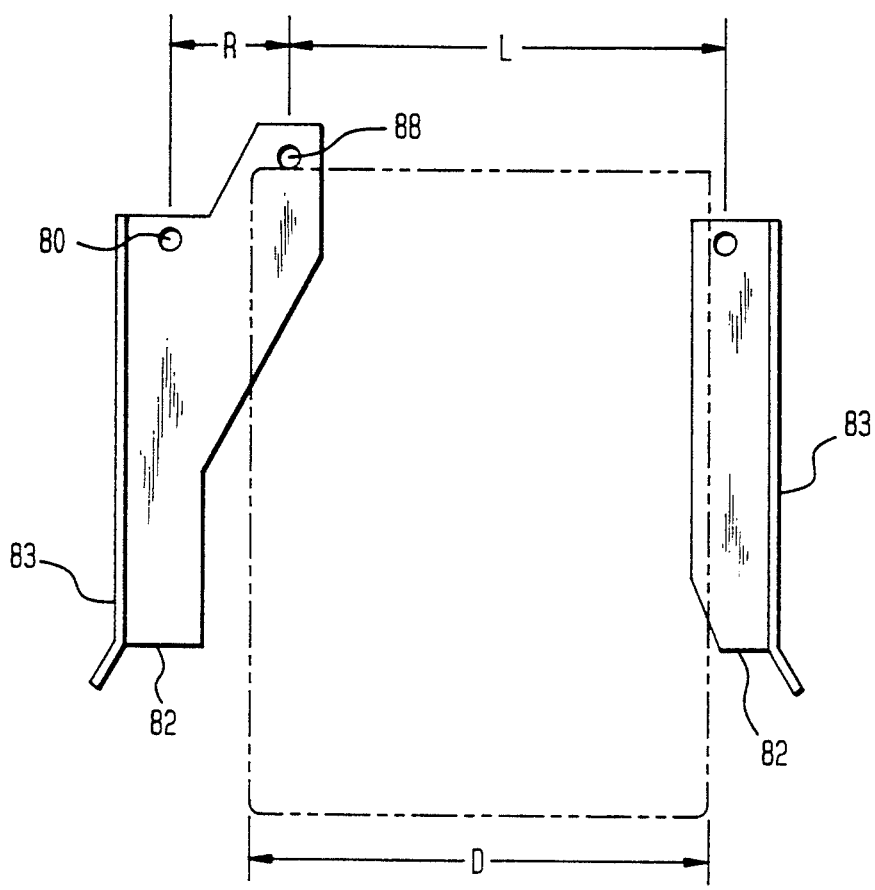
FIG. 9 is a plan view of the cassette holder.

One of the cassette bearers 82 is extended inwardly, and an insertion preventing pin 88 is erected on the extended portion. The insertion preventing pin 88 is located deep inside to the engaging pins 80, and the distance between the insertion preventing pin 88 and the engaging pin 80 in the longitudinal direction is longer than the sliding distance of the slider 30. As shown in FIG. 9, the insertion preventing pin 88 is located so that distances L and R between the insertion preventing pin 88 and the engaging pins 80 are both shorter than the length D of the cassette in the transverse direction ($D>L$ and $D>R$).

The cassette is usually shorter in the longitudinal direction than in the transverse direction. Accordingly, if the cassette is inserted into the cassette holder in the transverse direction, the cassette is likely to bump against a rotary head cylinder of the apparatus. In this example, however, the insertion preventing pin 88 is located so as to block the cassette from being inserted between the engaging pins 80, thereby preventing the further insertion of the cassette. As a result, the rotary head cylinder is protected against being damaged.

Figure 10:
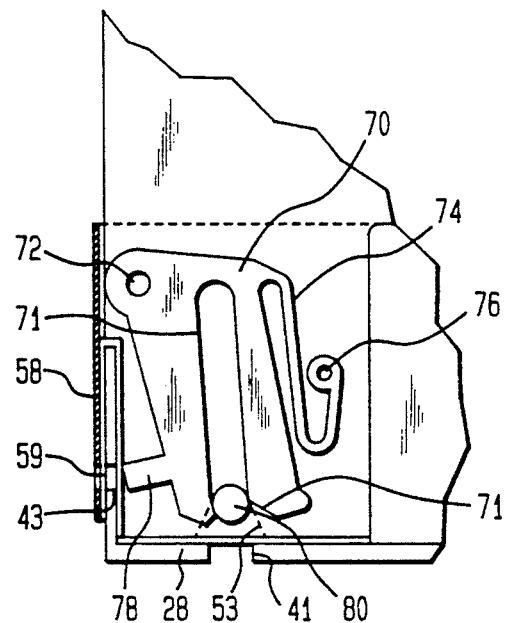
FIG. 10 is a bottom view illustrating an operation of the lock.

An example of the operation of the cassette will be described:

A cassette is moved forwardly, and the front face 40 of the front cover 28 is inserted into the insertion opening 81. The cassette is guided along the guide surface 83 and is moved into the cassette holder while the upper surface of the cassette is pressed downwardly by the pressure roller 86. While the cassette is moved into the cassette holder, the cassette is kept in a horizontal state. The engaging pin 80 of the cassette bearer 82 is inserted into the recess 53 of the slider 30 through the cutout 41 of the front face 40. At this stage, the cassette is further inserted into the cassette holder, thereby bringing the engaging pin 80 into contact with the inlet portion 71a of the lock 70. The cassette is still further inserted into the cassette holder, whereby the engaging pin 80 pressurizes the inlet portion 71a inwardly and thus rotates the lock 70 around the fixing pin 72 against a force of the elastic piece 74 (FIG. 10). In this way, the locking part 78 of the lock 70 moves away from the engaging slot 59 of the slider 30 and also from the cutout 43 of the leg portion 42. This movement of the locking part 78 makes the slider 30 slidable in the longitudinal direction. When the lock 70 is rotated inwardly, the guide groove 71 is extended substantially in the longitudinal direction.

At this stage, the cassette is further inserted into the cassette holder, whereby the engaging pin 80 reaches an innermost portion of the recess 53 and is located in the guide groove 71 away from the inlet portion 71a. The cassette is still further inserted into the cassette holder, whereby the engaging pin 80 pressurizes the recess 53 rearwardly with respect to the housing 2, while sliding in and along the guide groove 71 of the lock 70. By this movement of the engaging pin 80, the slider 30 is slid rearwardly with respect to the housing 2.

When the slider 30 is moved rearwardly by the engaging pin 80, the shaft 60 slides in and along the first guide slot 46. Since the first guide slot 46 is diagonally inclined, the shaft 60 smoothly slides therein. In this way, the leg portion 42 is upwardly rotated around the guide post 50. The guide post 50 slides in and along the second guide slot 48, thereby allowing the front cover 28 to upwardly rotate while sliding rearwardly. In this way, the front cover 28 positioning in front of the extended tape 8 between the guides 24 is upwardly rotated while the front face 40 is sliding rearwardly. Because of the arched configuration, the leg portion 42 is smoothly rotated.

Figure 11:
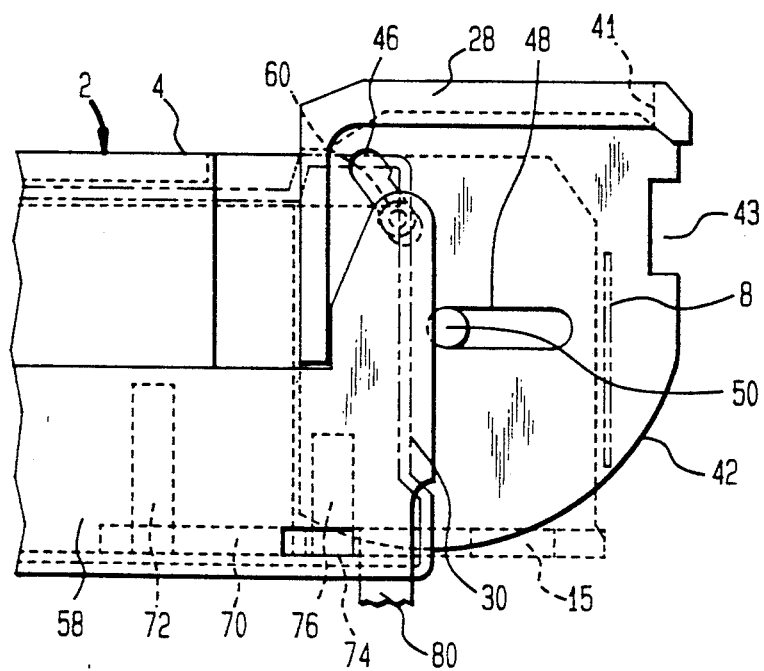
FIG. 11 is a side view illustrating an operation of the slider and a front cover in the state shown in FIG. 10.

As shown in FIG. 11, when the front cover 28 is rotated at 90° until its horizontal state is reached, the extended tape 8 is exposed to the outside. At this stage, the shaft 60 is located in a bent portion of the first guide slot 46. The second guide slot 48 is maintained horizontal, thereby enabling the guide post 50 to position in a rearward end portion of the second guide slot 48. The abutment 44 of the leg portion 42 is in a suspended position above the side portion 58 of the slider 30.

Figure 12:
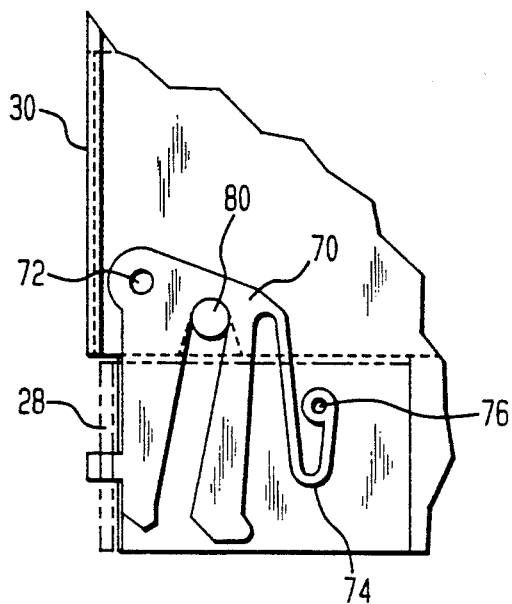
FIG. 12 is a bottom view illustrating a further example of operation of the lock.
Figure 13:
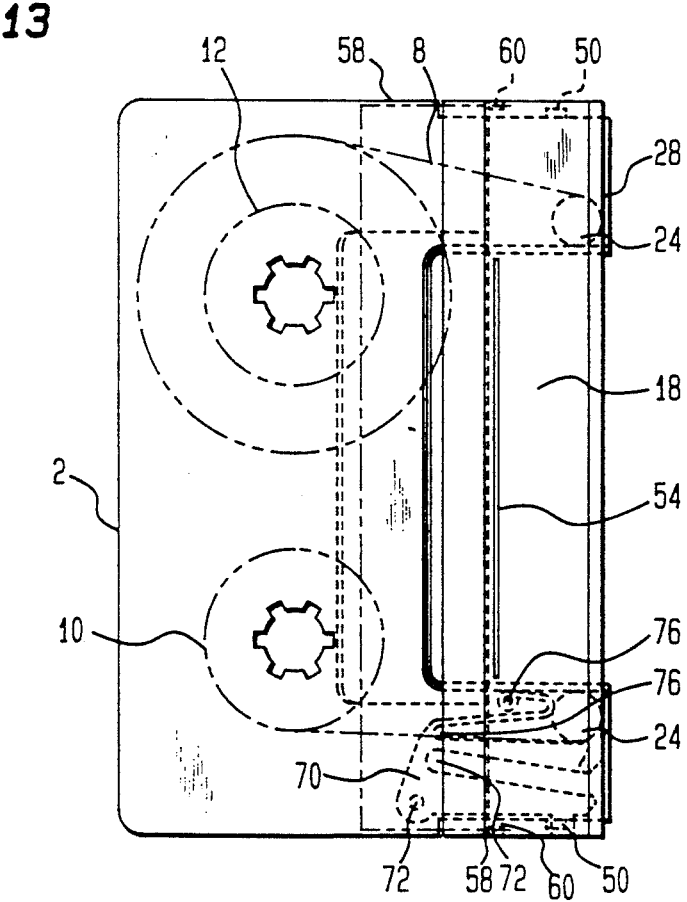
FIG. 13 is a plan view of the tape cassette in the state shown in FIG. 12.
Figure 14:
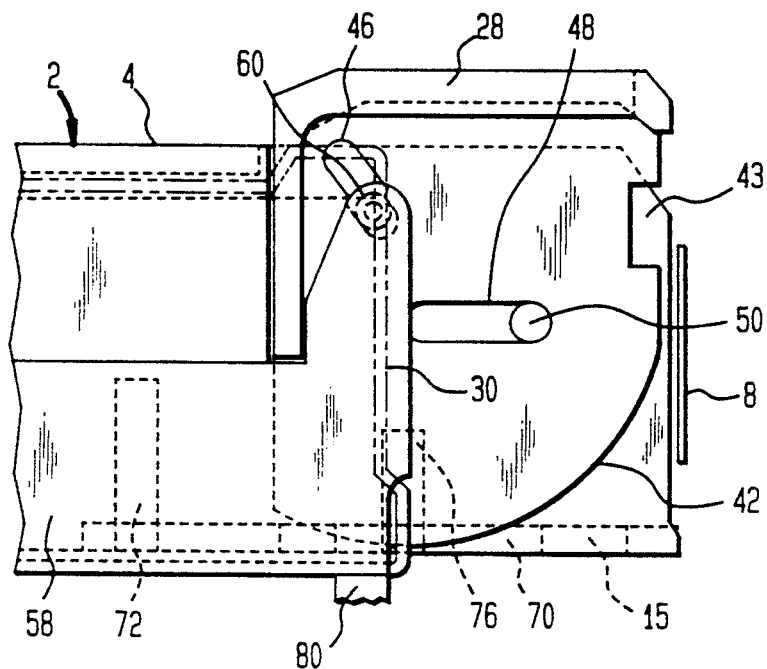
FIG. 14 is a side view of the main part of the tape cassette in the state shown in FIG. 13.

When the cassette is further inserted into the cassette holder at this stage, the slider 30 is further moved rearwardly by the engaging pin 80 in relation to the housing 2, thereby enabling the shaft 60 to move rearwardly. The shaft 60 is restrained from vertical movement, and the guide post 50 is located in the horizontally maintained second guide slot 48, thereby allowing the leg portion 42 to move rearwardly. The guide post 50 slides forwardly in and along the second guide slot 48 in accordance with the rearward movement of the leg portion 42. As the leg portion 42 moves rearwardly, the horizontally maintained front cover 28 slides rearwardly. The engaging pin 80 reaches the inner portion of the guide groove 71 of the lock 70, thereby prohibiting the cassette from being further inserted into the cassette holder (FIG. 12). At this point, the front portion 54 of the slider 30 comes to a point adjacent to a rearward end of the opening 18 (FIG. 13), and the abutment 44 of the leg portion 42 is brought into an upright position and takes a position between the upper portion 4 and the slider 30 (FIG. 14). The abutment 44 is maintained in the upright position, and the leg portion 42 is maintained in the rotating position. The front face 40 of the front cover 28 is also maintained in a horizontal position, and takes a position above the opening 18. The front cover 28 is away from the extended tape 8 so that a space is produced above the opening 18 to allow the loading post to enter therein.

When the cassette is placed in the apparatus in this way, the loading post is led into the opening 18 of the housing 2 so as to catch the tape 8 and stretch it from the first reel 10 or the second reel 12. The tape 8 is brought to mount on an outer surface of a cylinder housing a rotary magnetic head therein. Then, the first reel 10 or the second reel 12 is driven so as to enable the tape 8 to run and the cylinder to rotate. In this way, the intended recording or reproduction is achieved.

When the cassette is to be dismounted from the apparatus, the tape 8 is disengaged from the cylinder, and the first reel 10 or the second reel 12 is driven so as to enable the tape 8 to wind around it. The loading post is withdrawn from the opening 18. Then, the cassette is moved rearwardly against engaging pin 80, thereby moving the slider 30 forwardly by the force of the spring 31. Thus, the front cover 28 is moved forwardly and then rotates downwardly until it covers the tape 8. The engaging pin 80 is disengaged from the guide groove 71 of the lock 70, thereby inserting the locking part 78 into the engaging slot 59 of the side portion 58 through the cutout 41 so as to prohibit the slider 30 from sliding.

Example 2

Figure 16:
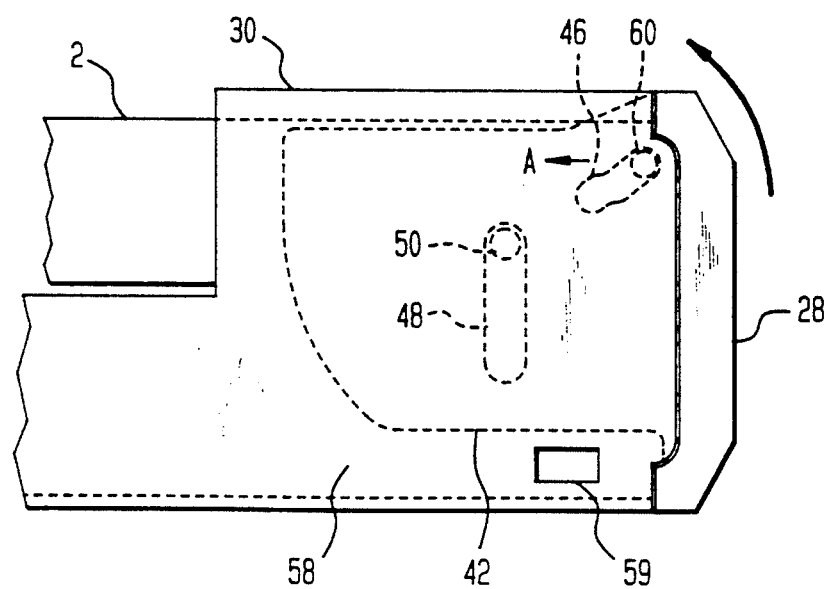
FIG. 16 is a side view of a main part of the tape cassette of FIG. 15.
Figure 15:
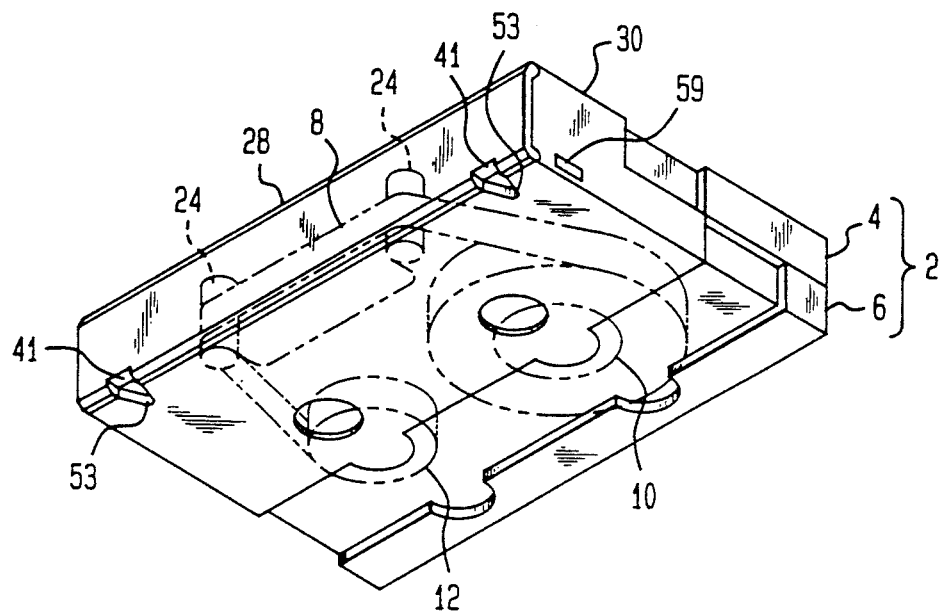
FIG. 15 is a perspective view seen from the bottom of a second example of the tape cassette according to the invention.
Figure 17:
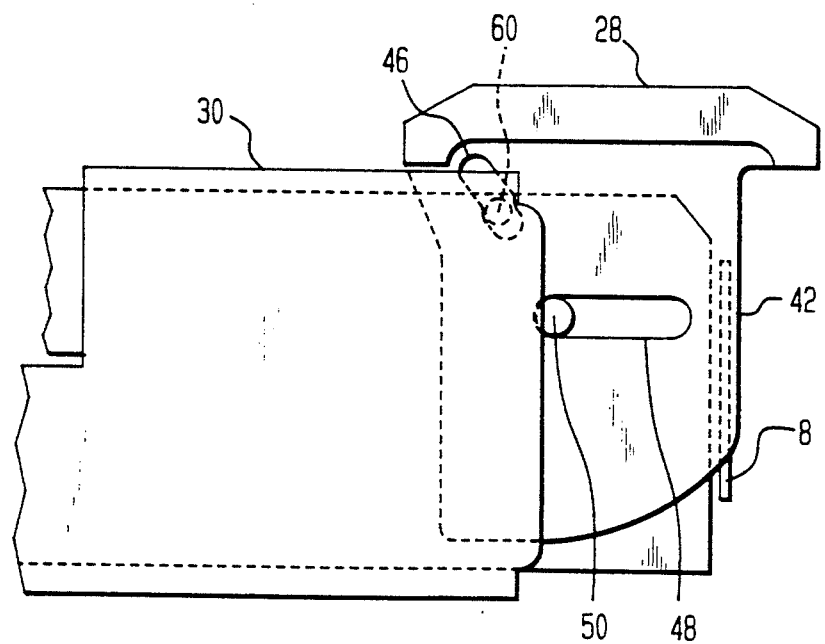
FIGS. 17 and 18 are side views of the main part, each illustrating an operation of the tape cassette of FIG. 15.
Figure 18:
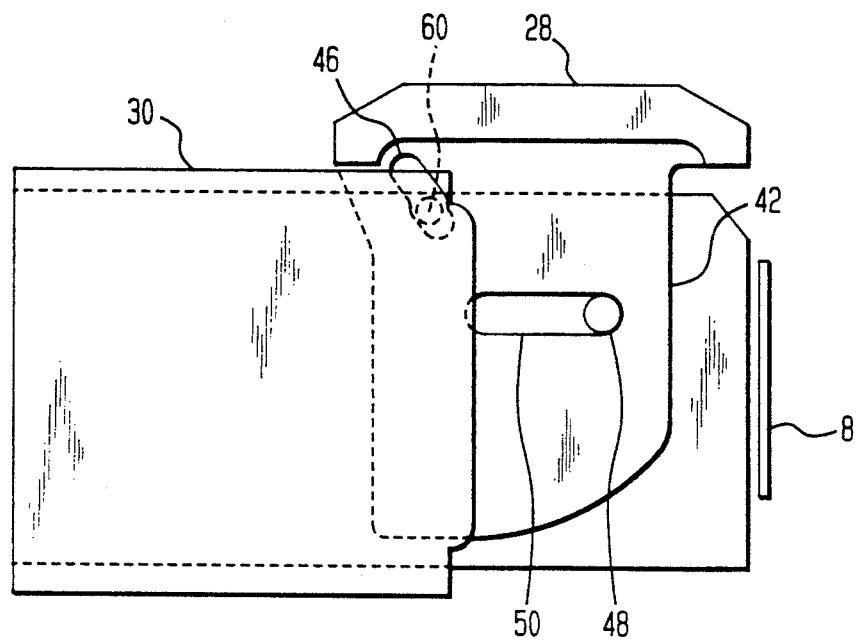

Referring to FIGS. 15 to 22, another example will be described, wherein like numerals designate similar members in Example 1. Only one side of the cassette will be described, and the other side will be omitted for simplicity:

As in the previous example, the cassette comprises the cassette housing 2 composed of the upper portion 4 and the lower portion 6. The housing 2 includes the first reel 10 and the second reel 12, and the tape 8 is carried on these reels. The housing 2 has the front cover 28 and the slider 30 in a front portion thereof, and the tape 8 is extended between a pair of guides 24 in front of the opening 18 of the housing 2 (FIG. 15). The side portion 58 of the slider 30 is provided with the shaft 60, which is slidably supported in the first guide slot 46 of the leg portion 42 of the front cover 28. The housing 2 is provided with the guide post 50, which is slidably supported in the second guide slot 48 of the leg portion 42 (FIG. 16). In this construction, the slider 30 is slid rearwardly, whereby the front cover 28 is slid rearwardly while being upwardly rotated (FIG. 17). The slider 30 is slid further rearwardly, whereby the front cover 28 is slid rearwardly while keeping the upward position (FIG. 18). In the state where the slider 30 is at the forward position, a forward part of the side portion 58 of the slider 30 covers the leg portion 42.

Figure 19A:
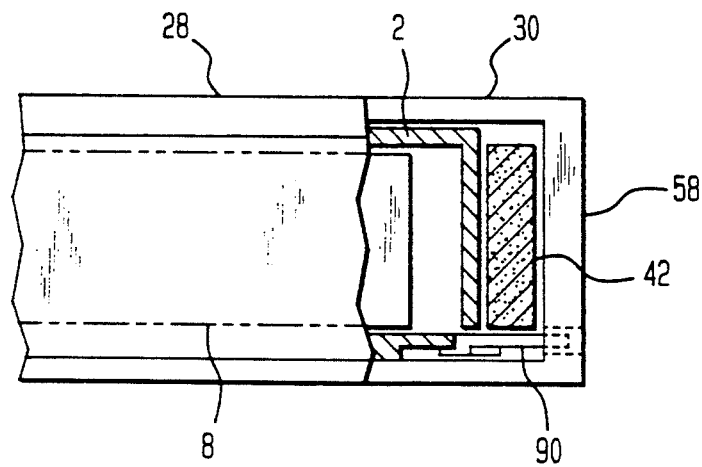
FIG. 19A is a partial sectional front view of the main part illustrating a lock disposed in the tape cassette of FIG. 15.
Figure 19B:
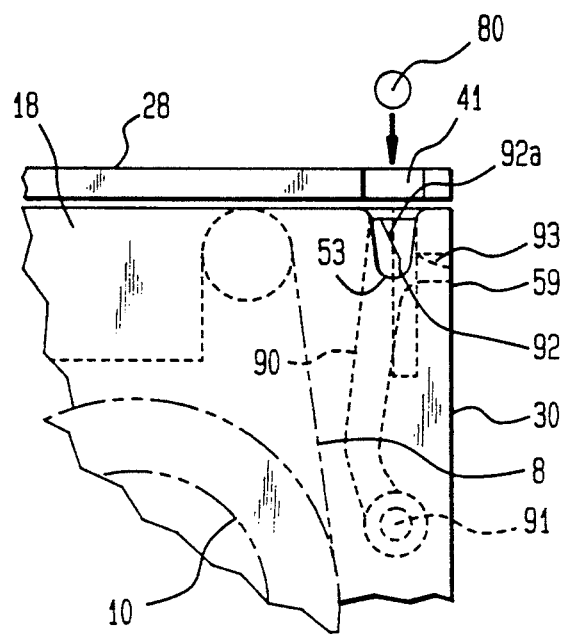
FIG. 19B is a bottom view thereof.
Figure 19C:
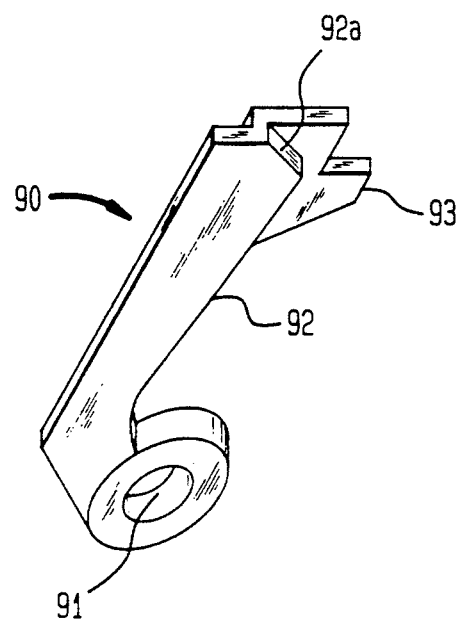
FIG. 19C is a perspective view seen from the bottom of the lock of the tape cassette of FIG. 15.

As shown in FIGS. 19A to 19C, the projecting part 14 of the housing 2 has a lock 90 for locking the slider 30 to the housing 2. The lock 90 is extending along the side surface of the housing 2, and a rear end of the lock 90 is rotatably supported by a supporting shaft 91 which is erected on a bottom of the projecting part 14. An outer side surface of lock 90 is a guide surface 92 for guiding the engaging pin 80 disposed in the cassette holder. A forward portion of the guiding surface 92 is an inlet portion 92a, which is diagonally inclined so as to locate a forward portion thereof more inwardly than a rear portion thereof. The inlet portion 92a is located in the recess 53 of the bottom portion 52 of the slider 30. The lock 90 is normally loaded by an elastic member (not shown) so as to rotate a forward end thereof outwardly.

The lock 90 is provided with a locking part 93 at a forward end, the locking part being extended outwardly so as to cover the inlet portion 92a and a vicinity thereof (FIG. 19C). The height of the leg portion 42 is determined so that there is a sufficient space below the leg portion 42 for the locking part 93 loaded by the elastic member to pass through in the state where the front cover 28 is at the downward position. The locking part 93 passes under the leg portion 42 and then is inserted into the engaging slot 59 of the side portion 58 of the slider 30.

Figure 20A:
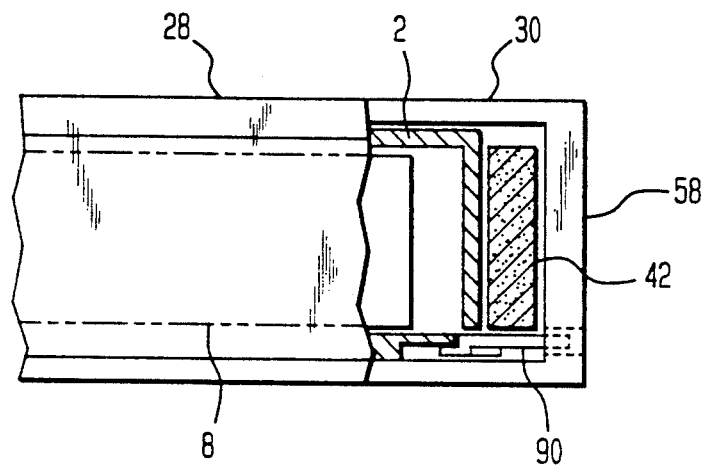
FIG. 20A is a partial sectional front view of the main part illustrating an operation of the lock of the tape cassette of FIG. 15.
Figure 20B:
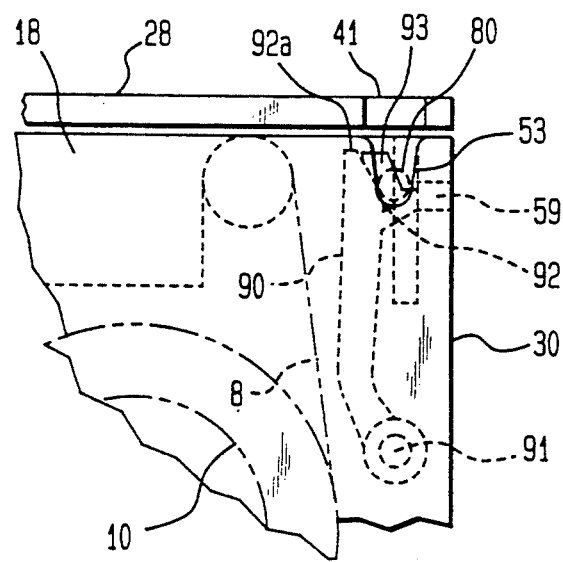
FIG. 20B is a bottom view thereof.

In operation, when the cassette is inserted into the cassette holder of the apparatus forwardly, the engaging pin 80 of the cassette holder passes through the cutout 41 of the front face 40 of the front cover 28 and goes into the recess 53. By this movement, an upper end of the engaging pin 80 comes into contact with the inlet portion 92a, thereby pressurizing the inlet portion 92a inwardly (FIGS. 20A and 20B). At this stage, the locking part 93 located above the inlet portion 92a is disengaged from the engaging slot 59, thereby enabling the slider 30 to slide rearwardly.

The cassette is further inserted into the cassette holder, whereby the engaging pin 80 reaches a rear end portion of the recess 53 and also comes into contact with the guide surface 92 away form the inlet portion 92a. The cassette is still further inserted into the cassette holder, whereby the engaging pin 80 pressurizes the recess 53 rearwardly, while sliding along the guiding surface 92. By this movement, the slider 30 is slid rearwardly with respect to the housing 2.

Figure 21A:
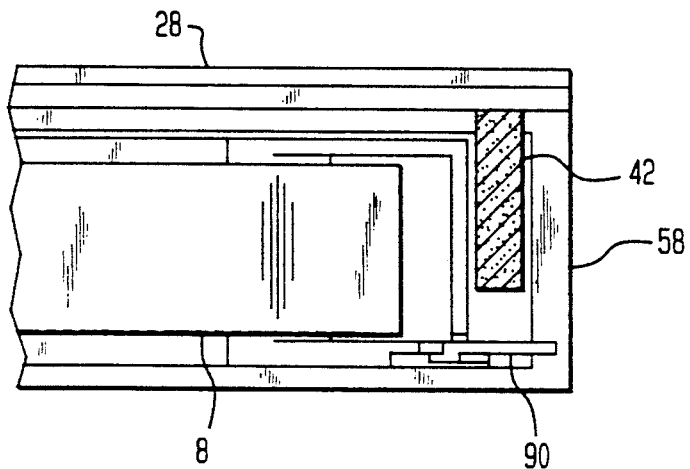
FIG. 21A is a front sectional view of the tape cassette illustrating a further example of operation of the lock of the tape cassette of FIG. 15.
Figure 21B:
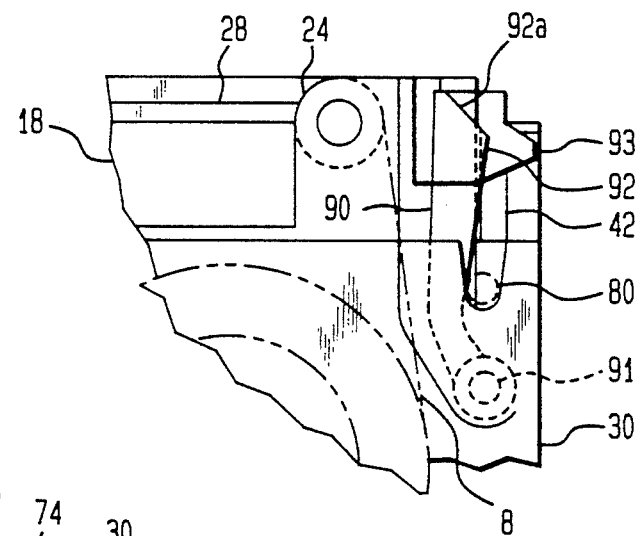
FIG. 21B is a bottom view thereof.
Figure 22:
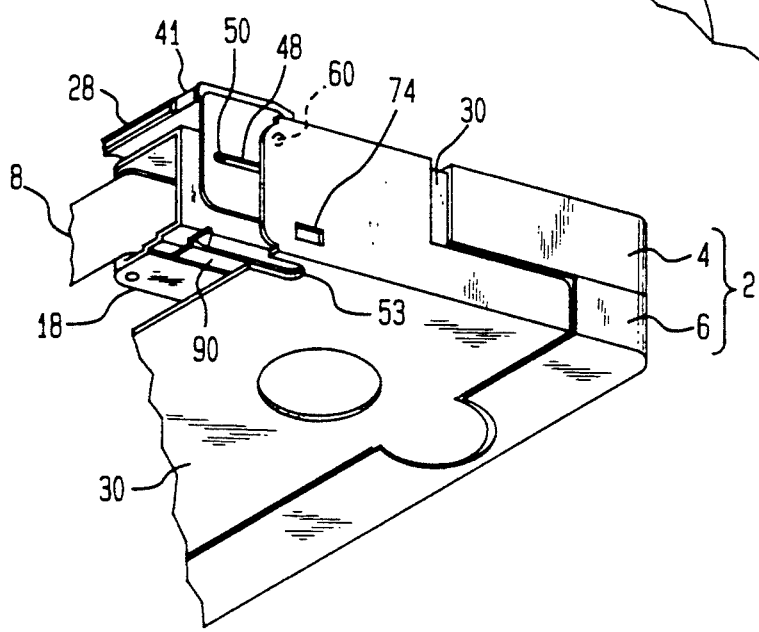
FIG. 22 is a perspective view seen from the bottom of the tape cassette in the state shown in FIGS. 21A and 21B.

By the rearward movement of the slider 30, the front cover 28 is upwardly rotated, thereby exposing the tape 8. The cassette is still further inserted into the cassette holder, whereby the engaging pin 80 moves the slider 30 rearwardly with respect to the housing 2 until the engaging pin 80 reaches a bent portion of the lock 90 (FIGS. 21A and 21B). The front cover 28 is slid rearwardly after the front face 40 thereof reaches a horizontal state, as shown in FIG. 22. The front face 40 is located rear to the exposed tape 8. In this state, the loading post of the apparatus is maneuvered into the opening 18, thereby stretching the tape 8 forwardly.

When the cassette is to be dismounted from the apparatus, the cassette is moved rearwardly with respect to the cassette holder, whereby the slider 30 is moved forwardly with respect to the housing 2. The front cover 28 is downwardly rotated, thereby covering the tape 8 with the front portion 54. The engaging pin 80 is disengaged from the recess 53, whereby the locking part 93 is inserted into the engaging slot 59, and thus the slider 30 is locked to the housing 2.

Example 3

Figure 23:
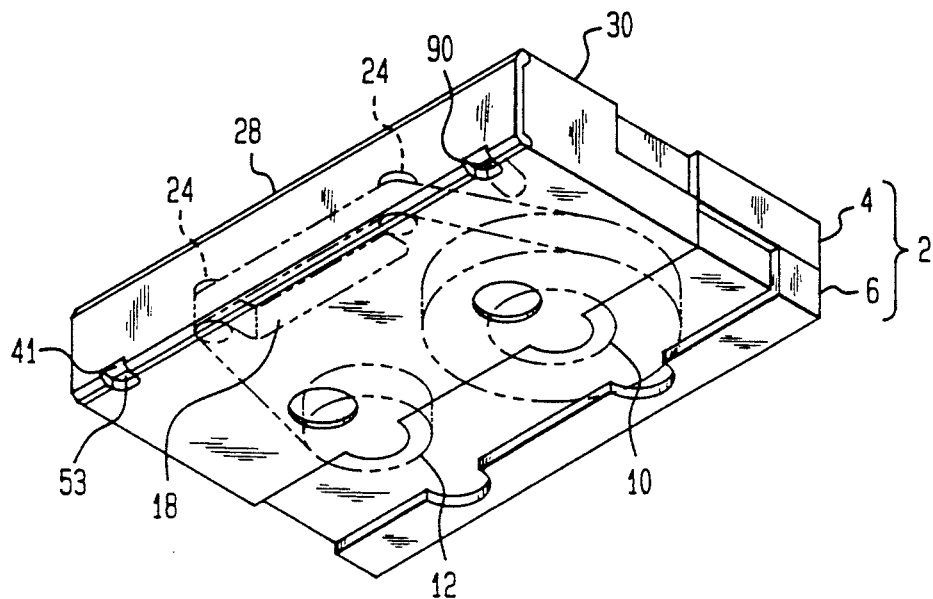
FIG. 23 is a perspective view seen from the bottom of a third example of the tape cassette according to the invention.
Figure 24:
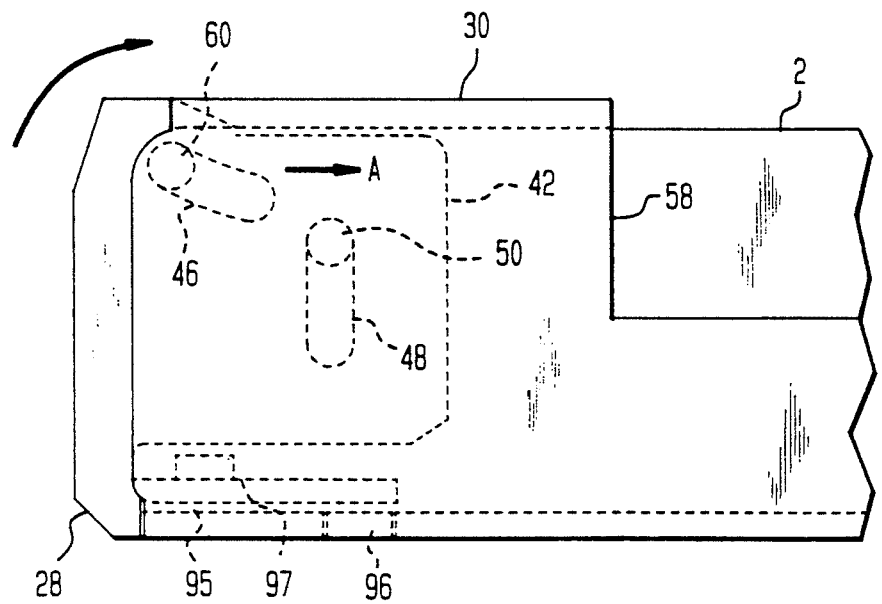
FIG. 24 is a side view of a main part of the tape cassette of FIG. 23.
Figure 25:
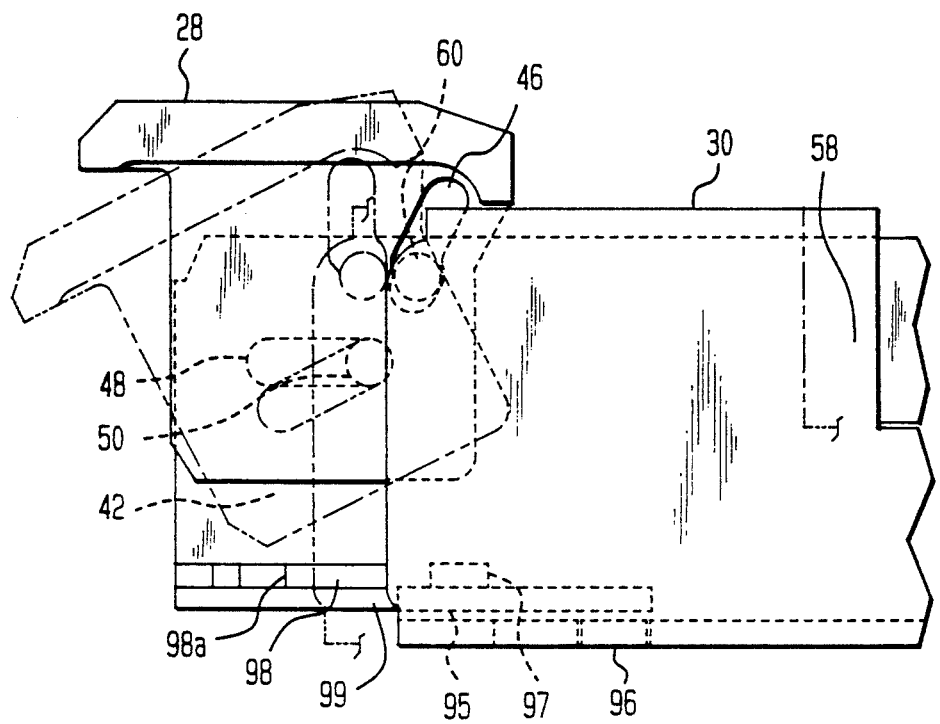
FIGS. 25 and 26 are side views of the main part, each illustrating an operation of the tape cassette of FIG. 23.
Figure 26:
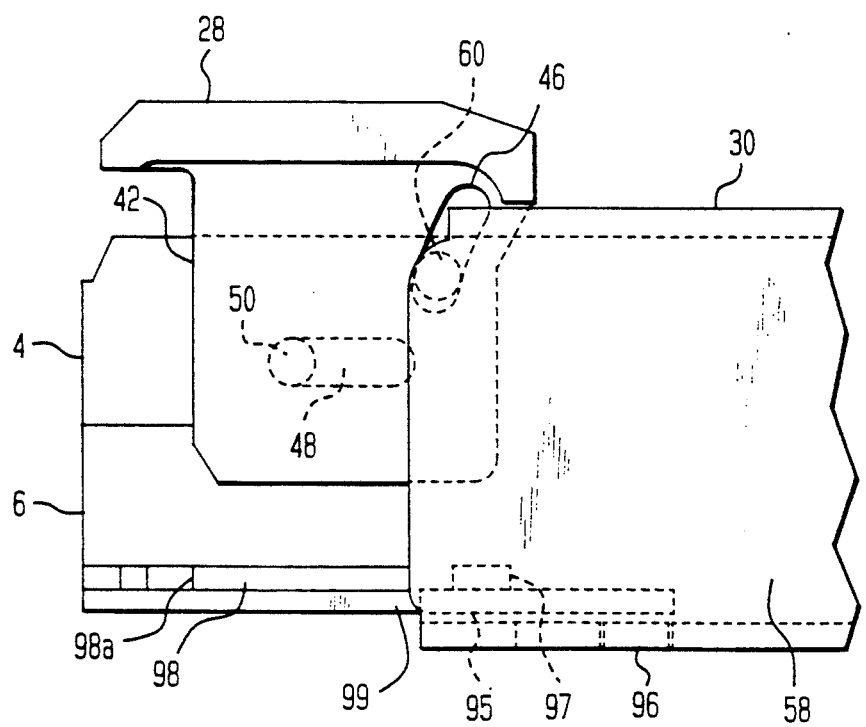

Referring to FIGS. 23 to 30, a third example will be described, wherein like numerals designate similar members in Examples 1 and 2. Only one side of the cassette will be described, and the other side will be omitted for simplicity:

As in the previous examples, the cassette comprises the cassette housing 2 composed of the upper portion 4 and the lower portion 6. The housing 2 includes the first reel 10 and the second reel 12, and the tape 8 is carried on these reels. The housing 2 has the front cover 28 and the slider 30 at the front portion thereof (FIG. 23). As shown in FIG. 24, the side portion 58 of the slider 30 is provided with the shaft 60, which is slidably supported in the first guide slot 46 of the leg portion 42 of the slider 30. The housing 2 is provided with the guide post 50, which is slidably supported in the second guide slot 48 of the leg portion 42. In this construction, the slider 30 is slid rearwardly, whereby the front cover 28 is slid rearwardly while being upwardly rotated (FIG. 25). The slider 30 is slid further rearwardly, whereby the front cover 28 is slid rearwardly while keeping the upward position (FIG. 26). The length of the leg portion 42 in the longitudinal direction is determined so that the leg portion 42 does not contact the slider 30 when the front cover 28 is upwardly rotated.

Figure 27A:
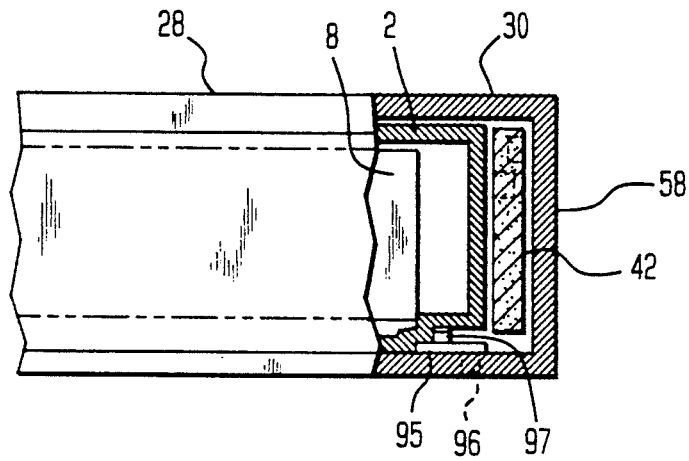
FIG. 27A is a partial sectional front view of the main part illustrating an operation of a lock disposed in the tape cassette of FIG. 23.
Figure 27B:
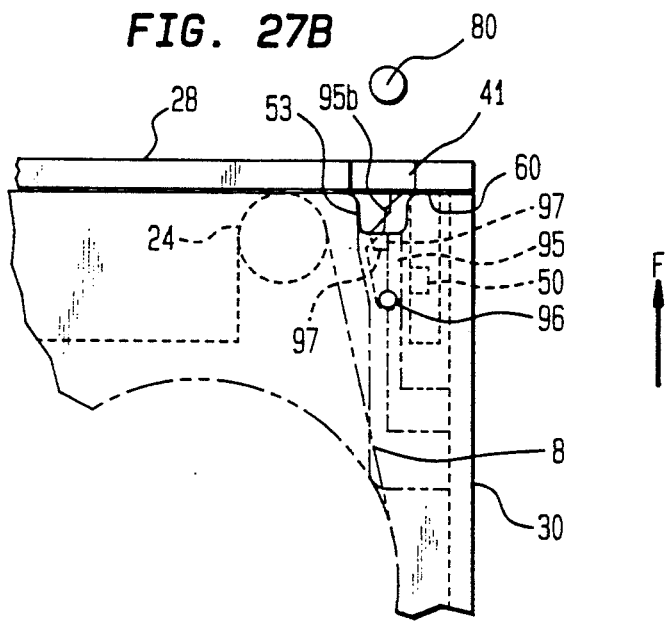
FIG. 27B is a bottom view thereof.
Figure 27C:
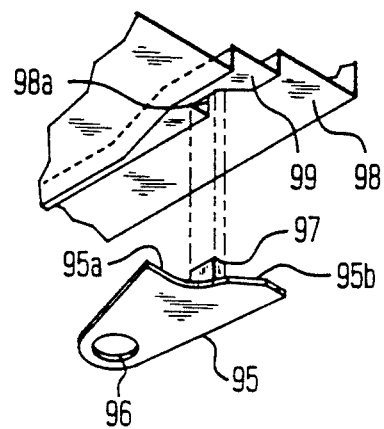
FIG. 27C is a perspective view seen from the bottom of the lock of the tape cassette of FIG. 23 shown together with a portion of a housing.
Figure 28:
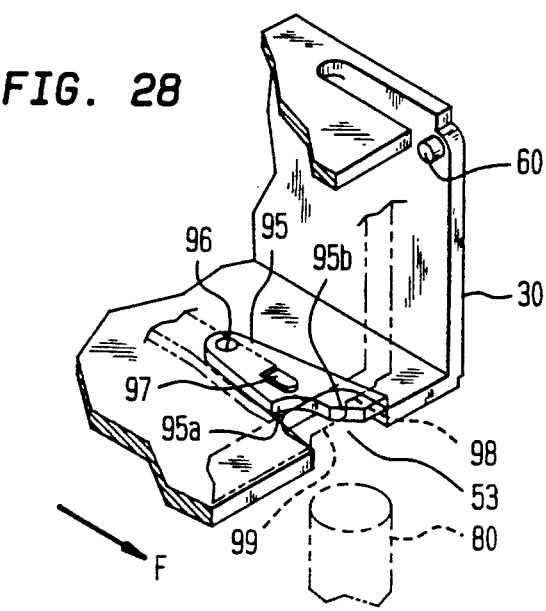
FIG. 28 is a perspective view of the lock shown together with a portion of a slider of the tape cassette of FIG. 23.
Figure 29A:
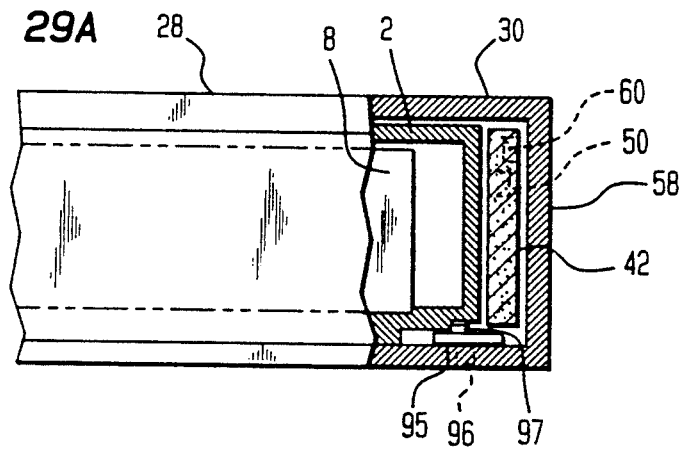
FIG. 29A is a partial sectional front view of the main part illustrating a further example of operation of the lock of the tape cassette of FIG. 23.
Figure 29B:
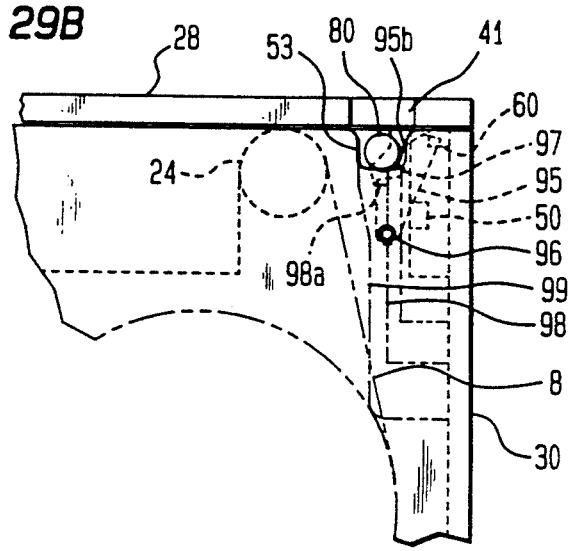
FIG. 29B is a bottom view thereof.

As shown in FIGS. 27A, 27B, 27C and 28, the bottom portion 52 of the slider 30 has a lock 95, a rear part of which is rotatably supported by a supporting shaft 96 erected on the bottom portion 52. The lock 95 is normally loaded by an elastic member (not shown) so as to rotate a forward portion thereof inwardly. The forward portion has a curved recess 95a, with which the engaging pin 80 comes into engagement (FIG. 27C). The periphery of the curved recess 95a is connected to an inclined portion 95b, which is diagonally inclined so as to locate a forward portion thereof more inwardly than a rear portion thereof. The lock 95 has a locking part 97 projected upwardly on an upper surface thereof.

The bottom of the projecting part 14 has a first guide groove 98 along an outer portion thereof and a second guide groove 99 inside the first guide groove 98. The first guide groove 98 and the second guide groove 99 are extended in the longitudinal direction and are open outwardly. The locking part 97 can be engaged with the second guide groove 99. The second guide groove 99 has a forward portion, a tapered portion which is connected to the forward portion and is gradually inclined outwardly and rearwardly, and a rear portion which is connected to the tapered portion. Each periphery of the recess 53, which is open forwardly, is extended in the longitudinal direction. The engaging pin 80 goes between the inner periphery of the recess 53 and the inclined portion 95b located in the recess 53. The engaging pin 80 goes into the recess 53, thereby pressurizing the inclined portion 95b outwardly.

The first guide groove 98 has a recess 98a, with which the locking part 97 is engaged.

In operation, when the cassette is inserted into the cassette holder of the apparatus, the engaging pin 80 of the cassette holder passes through the cutout 41 of the front face 40 and goes into the recess 53 of the bottom portion 52. By this movement, the upper end of the engaging pin 80 is located in the second guide groove 99 (FIGS. 29A and 29B), thereby coming into contact with the inclined portion 95b so as to rotate a forward end of the lock 95 outwardly. In this way, the locking part 97 is disengaged from the first guide groove 98, thereby enabling the slider 30 to slide with respect to the housing 2.

The tape cassette is further inserted into the cassette holder in this state, whereby the engaging pin 80 comes into engagement with the curved recess 95a. The cassette is still further inserted into the cassette holder, whereby the slider 30 is pressurized rearwardly with respect to the housing 2 by the engaging pin 80. At this stage, the engaging pin 80 is moved rearwardly in and along the second guide groove 99 until reaching a rear end of the second guide groove 99 (FIGS. 30A and 30B).

By the rearward movement of the slider 30, the front cover 28 is slid rearwardly while being upwardly rotated, thereby exposing the tape 8 (FIG. 25). The cassette is further inserted into the cassette holder, whereby the slider 30 is moved rearwardly by the engaging pin 80. The front face 40 of the front cover 28 takes a horizontal position, and then the front cover 28 is slid rearwardly, thereby locating the front face 40 rear to the exposed tape 8 (FIG. 26). At this stage, the loading post of the apparatus is maneuvered into the opening 18 of the housing 2, thereby stretching the tape 8 forwardly.

When the cassette is to be dismounted from the cassette, the cassette is moved rearwardly with respect to the cassette holder, whereby the slider 30 is moved forwardly with respect to the housing 2. The front cover 28 is downwardly rotated, thereby covering the tape 8. The engaging pin 80 is disengaged from the recess 53, thereby engaging the locking part 97 with the recess 98a. Thus, the slider 30 is locked to the housing 2.

Example 4

Figure 32:
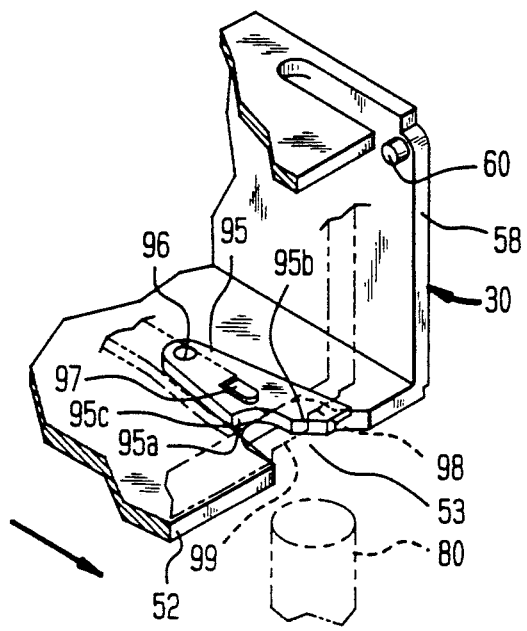
FIG. 32 is a perspective view of a lock disposed in the tape cassette of FIG. 31 shown together with a portion of a slider.
Figure 33:
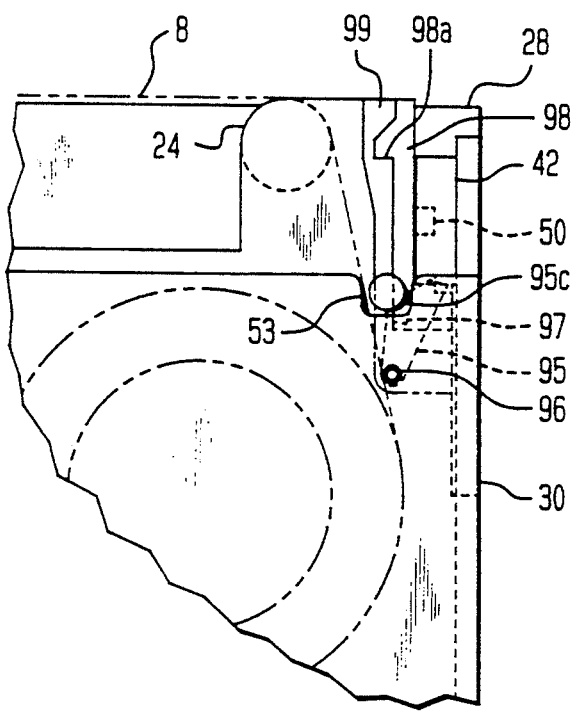
FIG. 33 is a bottom view of the main part illustrating an operation of the tape cassette of FIG. 31.

Referring to FIGS. 31 to 33, a fourth embodiment will be described, wherein like numerals designate similar members in Examples 1, 2 and 3. Only one side of the cassette will be described, and the other side will be omitted for simplicity:

This embodiment is different from Example 3 in the lock 95. As shown in FIGS. 31 and 32, the bottom of the lock 95 has a bank 95c projecting downwardly along a periphery of the recess 95a and the inclined portion 95b. The bank 95c is located in the recess 53. A forward portion of the outer periphery of the recess 53 is diagonally inclined so as to locate a forward portion thereof more outwardly than a rear portion thereof, whereby the bank 95c comes into engagement with the forward portion of the outer periphery of the recess 53.

In operation, when the engaging pin 80 is inserted into the recess 53 of the slider 30, the bank 95c is engaged with the engaging pin 80. The forward end of the lock 95 is surely rotated outwardly. When the locking part 97 is disengaged from the recess 98a of the first guide groove 98, the bank 95c in engagement with the engaging pin 80 is pressure-contacted on the periphery of the recess 53. The engaging pin 80 pressurizes the slider 30 through the bank 95c, thereby sliding the slider 30 rearwardly with respect to the housing 2. When the engaging pin 80 is slid rearwardly along the second guide groove 99, the engaging pin 80 reaches a rear end of the second guide groove 99 (FIG. 33).

In this example, since the engaging pin 80 and the slider 30 are in pressure-contact with each other through the bank 95c, the sliding movement of the slider 30 is assured.

Example 5

Figure 34:
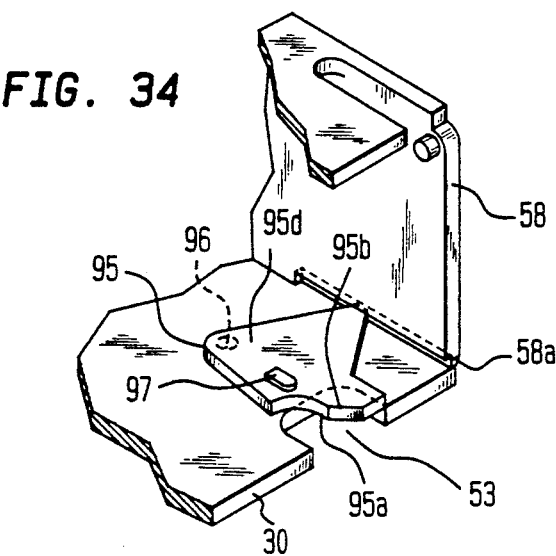
FIG. 34 is a perspective view of a lock and a portion of a slider of a fifth example of the tape cassette according to the invention.
Figure 35:
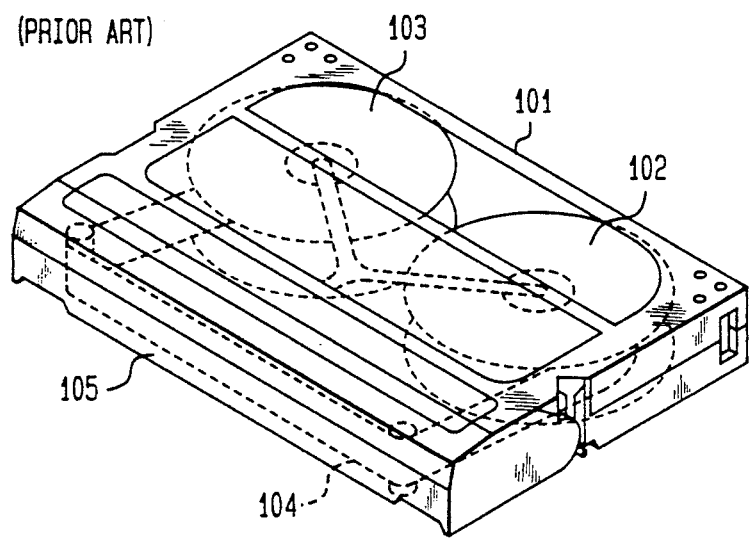
FIG. 35 is a perspective view of an example of the conventional tape cassette.
Figure 36:
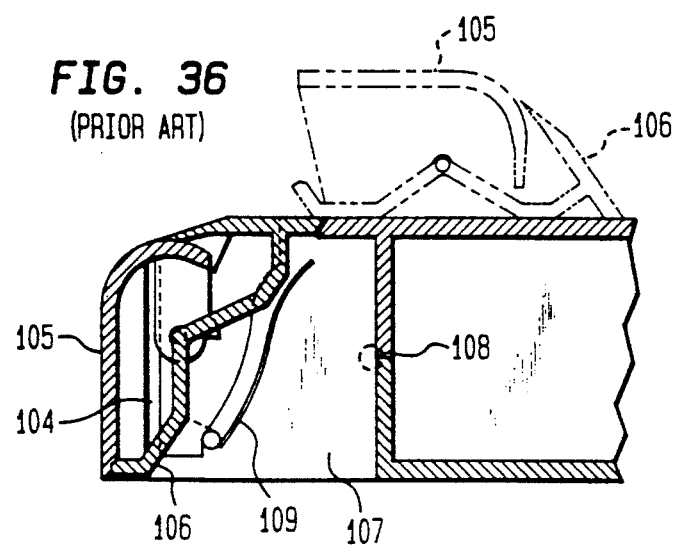
FIG. 36 is a cross-sectional view of a main part of the conventional tape cassette of FIG. 35.
Figure 37:
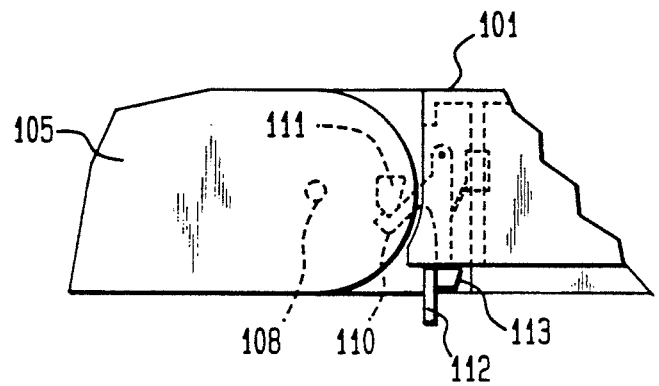
FIG. 37 is a side view of the main part of the conventional tape cassette of FIG. 35.
Figure 38:
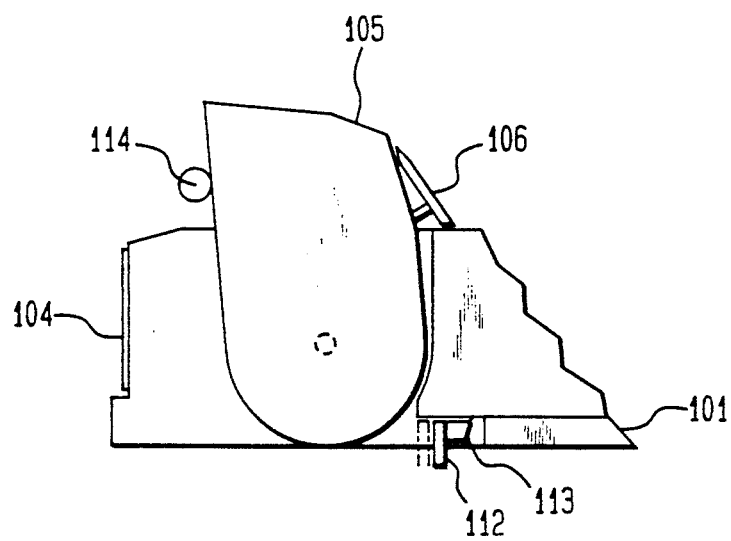
FIG. 38 is a side view of the main part illustrating an operation of the conventional tape cassette of FIG. 35.

Referring to FIG. 34, a fifth embodiment will be described, wherein like numerals designate similar members in Examples 1, 2, 3, and 4. Only one side of the cassette will be described, and the other side will be omitted for simplicity:

This embodiment is different from Example 3 in the lock 95. The lock 95 has a wing 95d extended outwardly in a tapered state. An end of the wing 95d is loosely engaged with a groove 58a of the side portion 58 of the slider 30 in the manner that the wing 95c does not disturb the rotation of the lock 95. The groove 58a is extended in the longitudinal direction.

The lock 95 is attached to the slider 30 in the following manner:

After the wing 95d of the lock 95 is inserted into the groove 58a, the shaft 96 is attached to the lock 95 so that the shaft 96 is erected on a specified portion of the slider 30. In this way, the lock 95 is attached to the slider 30 in a specified posture.

Concerning the operation of the lock 95, this example is the same as the third embodiment except that the lock 95 can be stably rotated around the shaft 60 and also can be stably slid rearwardly with respect to the housing 2 because the wing 95d of the lock 95 is slidably inserted into the groove 58a. Further, the lock 95 is stably attached to the slider 30, thereby improving durability.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A tape cassette comprising:
   a housing including a pair of reels carrying a tape so as to expose the tape in front of said housing;
   a slider attached to said housing so as to be slidable forwardly and rearwardly along a direction perpendicular to a tape extending direction, said slider having a recess into which an engaging member of a magnetic recording and reproducing apparatus for sliding said slider is allowed to insert, the slider sliding rearwardly in accordance with an insertion of the engaging member into the recess rearward with respect to the housing:
   a front cover supported by said slider and by said housing so as to cover the tape;
   a moving mechanism for sliding said front cover away from the tape while rotating said front cover so as to expose the tape, in accordance with a movement of said slider away from the tape; and
   a locking member attached to said slider to lock said hosing during loading so as to prohibit said slider from sliding rearwardly, said locking member unlocking said housing by insertion of the engaging member into the recess of the slider; and
   wherein said housing includes a pair of projecting parts disposed in opposite side portions along the tape extending direction and an opening defined by the projecting parts so as to allow loading posts to be inserted therein in the opposite direction to a direction of the rotation of the front cover for exposing the tape; said slider includes a pair of surfaces, each covering a side of the opening into which said loading posts are inserted and a side surface of the corresponding projecting part; and said locking member is provided in a pair, each of said locking members being located between the corresponding surface of said slider and the corresponding projecting part; and
   wherein each of said locking members includes a locking part projected toward the corresponding projecting part; each projecting part has a first guide groove with which the locking part is engaged so as to be slid in a sliding direction of said slider; and the first guide groove has a recess which the locking part engages so as to prohibit said slider from sliding with respect to said housing.

2. A tape cassette according to claim 1, wherein each of said locking member has an engaging portion with which the engaging member to be engaged with the corresponding recess of said slider is to be engaged.

3. A tape cassette according to claim 2, wherein each projecting member has a second guide groove, along which the engaging member in engagement with the corresponding engaging portion of said locking member is guided in said sliding direction of said slider.

4. A tape cassette according to claim 3, wherein the engaging portion of each of said locking member includes a periphery, which has a bank to be engaged with the corresponding recess of said slider.

5. A tape cassette according to claim 3, wherein each of said locking member has a wing projected toward the corresponding surface of said slider; and an end of the wing is slidably engaged with a groove formed in the corresponding surface of said slider.

* * * * *

UNITED STATES PATENT AND TRADEMARK OFFICE
CERTIFICATE OF CORRECTION

PATENT NO.   : 5,331,498
DATED        : July 19, 1994
INVENTOR(S)  : Utsumi et al.

It is certified that error appears in the above-indentified patent and that said Letters Patent is hereby corrected as shown below:

The drawing sheets, consisting of Figs. 8, 19B and 30A, should be deleted to be replaced with the drawing sheets, consisting of Figs. 8, 19B and 30A, as shown on the attached page.

Signed and Sealed this

Sixth Day of December, 1994

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,331,498
DATED : July 19, 1994
INVENTOR(S) : Utsumi et al.

It is certified that error appears in the above-identified patent and that said Letters Patent is hereby corrected as shown below:

FIG. 8

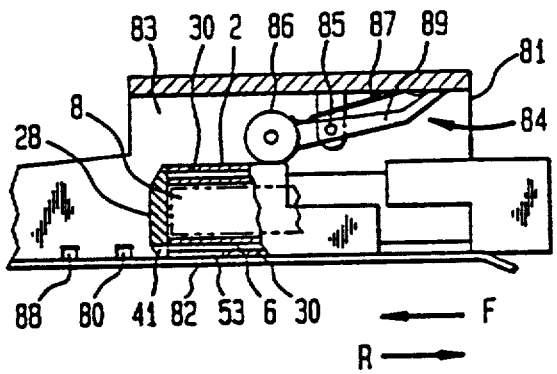

UNITED STATES PATENT AND TRADEMARK OFFICE
CERTIFICATE OF CORRECTION

PATENT NO. : 5,331,498
DATED : July 19, 1994
INVENTOR(S) : Utsumi et al.

It is certified that error appears in the above-identified patent and that said Letters Patent is hereby corrected as shown below:

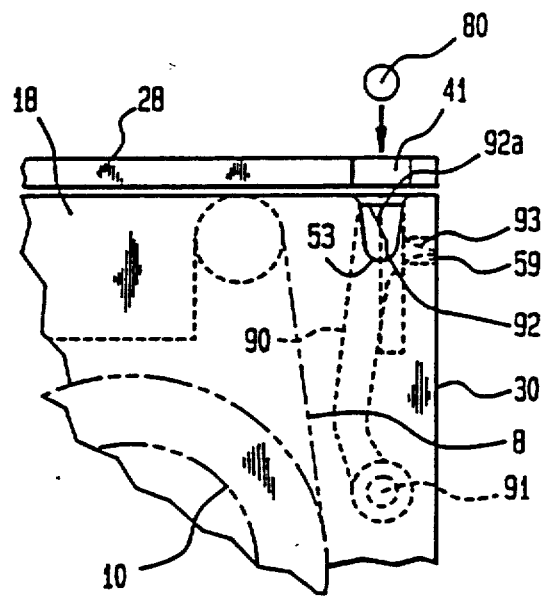

FIG. 19B

UNITED STATES PATENT AND TRADEMARK OFFICE
CERTIFICATE OF CORRECTION

PATENT NO. : 5,331,498    Page 4 of 4
DATED : July 19, 1994
INVENTOR(S) : Utsumi et al.

It is certified that error appears in the above-identified patent and that said Letters Patent is hereby corrected as shown below:

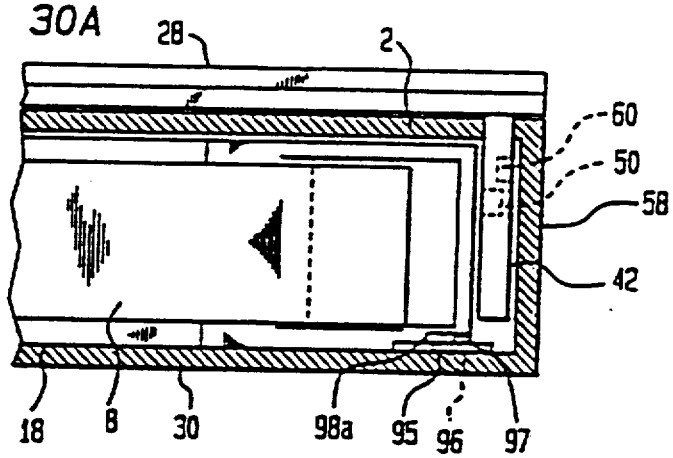

FIG. 30A